US012167989B2

(12) United States Patent
Gift et al.

(10) Patent No.: US 12,167,989 B2
(45) Date of Patent: Dec. 17, 2024

(54) PEDIATRIC DOSING DISPENSER

(71) Applicant: Berry Global, Inc., Evansville, IN (US)

(72) Inventors: Steven Gift, Lititz, PA (US); Jacob B. Robison, Marietta, PA (US); Michael M. Makhlouf, Lititz, PA (US); John A. Vassallo, Lititz, PA (US)

(73) Assignee: Berry Global, Inc., Evansville, IN (US)

(*) Notice: Subject to any disclaimer, the term of this patent is extended or adjusted under 35 U.S.C. 154(b) by 204 days.

(21) Appl. No.: 17/899,924

(22) Filed: Aug. 31, 2022

(65) Prior Publication Data

US 2023/0063077 A1 Mar. 2, 2023

Related U.S. Application Data

(60) Provisional application No. 63/339,078, filed on May 6, 2022, provisional application No. 63/333,247, filed on Apr. 21, 2022, provisional application No. 63/239,575, filed on Sep. 1, 2021.

(51) Int. Cl.
*A61J 7/00* (2006.01)
*B65D 50/06* (2006.01)

(52) U.S. Cl.
CPC ............ *A61J 7/0046* (2013.01); *B65D 50/06* (2013.01); *B65D 2215/04* (2013.01)

(58) Field of Classification Search
CPC ...... A61J 7/0046; A61J 1/1418; A61J 1/1437; B65D 50/06; B65D 2215/04; B65D 50/046; B65D 47/0804
See application file for complete search history.

(56) References Cited

U.S. PATENT DOCUMENTS

| | | | |
|---|---|---|---|
| 3,853,157 | A | 12/1974 | Madaio |
| 4,022,352 | A | 5/1977 | Pehr |
| 4,493,348 | A | 1/1985 | Lemmons |
| 4,940,167 | A | 7/1990 | Fillmore |
| 5,205,431 | A | 4/1993 | Zinnbauer |
| 5,213,235 | A | 5/1993 | Miranda |
| 5,314,084 | A | 5/1994 | Folta |
| 5,356,017 | A | 10/1994 | Rohr |
| 5,573,516 | A | 11/1996 | Tyner |
| 5,620,434 | A | 4/1997 | Brony |
| 5,765,705 | A | 6/1998 | Deubel |
| 5,911,252 | A | 6/1999 | Cassel |
| 6,065,648 | A | 5/2000 | Tauber |
| 6,405,885 | B1 | 6/2002 | Elliott |

(Continued)

FOREIGN PATENT DOCUMENTS

| | | | |
|---|---|---|---|
| EP | 1424292 | A1 | 6/2004 |
| GB | 2513840 | A | 11/2014 |

(Continued)

OTHER PUBLICATIONS

First Chinese Office Action for Chinese Patent App. No. 202080032881.9 dated Feb. 11, 2023, 14 pages.

(Continued)

*Primary Examiner* — Vishal Pancholi
(74) *Attorney, Agent, or Firm* — Barnes & Thornburg LLP

(57) ABSTRACT

A package that is configured to store and dispense fluids. The package includes a container and a dosing dispenser for closing an opening to the container. The dosing dispenser includes a body portion having a discharge aperture. Discharge aperture may be closed and opened using a flip-top cap of the dosing dispenser.

20 Claims, 26 Drawing Sheets

(56) References Cited

U.S. PATENT DOCUMENTS

| | | | |
|---|---|---|---|
| 6,866,164 | B2 | 3/2005 | Branson |
| 7,077,176 | B2 | 7/2006 | Py |
| 7,404,495 | B2 | 7/2008 | Keung |
| 7,451,896 | B2 | 11/2008 | Robinson |
| 7,568,509 | B2 | 8/2009 | Py |
| 8,211,082 | B2 | 7/2012 | Hasegawa |
| 8,272,411 | B2 | 9/2012 | Py |
| 8,459,312 | B2 | 6/2013 | Manera |
| 8,511,492 | B2 | 8/2013 | Webster |
| 8,783,483 | B2 | 7/2014 | Faragher |
| 9,156,569 | B2 | 10/2015 | Vassallo |
| 9,296,531 | B2 | 3/2016 | Luzbetak |
| 9,849,067 | B2 | 12/2017 | Vassallo |
| 9,884,706 | B1 | 2/2018 | Skillin |
| 10,058,481 | B1 | 8/2018 | Russo |
| 10,689,169 | B1 | 6/2020 | Meshberg |
| 11,242,185 | B2 | 2/2022 | Marantis |
| 2003/0201283 | A1 | 10/2003 | Branson |
| 2005/0133475 | A1 | 6/2005 | Goto |
| 2005/0178462 | A1 | 8/2005 | Py |
| 2005/0205607 | A1 | 9/2005 | Hierzer |
| 2006/0186077 | A1 | 8/2006 | Robinson |
| 2007/0084524 | A1 | 4/2007 | Py |
| 2007/0144996 | A1 | 6/2007 | Sawyer |
| 2007/0214692 | A1 | 9/2007 | Ferrara |
| 2008/0237278 | A1 | 10/2008 | Gaus |
| 2009/0152269 | A1 | 6/2009 | Pucci |
| 2010/0063473 | A1 | 3/2010 | Schwarz |
| 2010/0089861 | A1 | 4/2010 | Rutter |
| 2010/0154245 | A1 | 6/2010 | Py |
| 2010/0327010 | A1 | 12/2010 | Manera |
| 2011/0168292 | A1 | 7/2011 | Luzbetak |
| 2012/0103468 | A1 | 5/2012 | Terwilliger |
| 2012/0103469 | A1 | 5/2012 | Terwilliger |
| 2012/0103470 | A1 | 5/2012 | Terwilliger |
| 2012/0104054 | A1 | 5/2012 | Terwilliger |
| 2012/0211505 | A1 | 8/2012 | Vollers |
| 2013/0102989 | A1 | 4/2013 | Mccoy |
| 2013/0160891 | A1 | 6/2013 | Vassallo |
| 2013/0180618 | A1 | 7/2013 | Py |
| 2013/0270273 | A1 | 10/2013 | Fox |
| 2014/0261860 | A1 | 9/2014 | Heath |
| 2015/0112296 | A1 | 4/2015 | Ishiwata |
| 2015/0209230 | A1 | 7/2015 | Lev |
| 2016/0130049 | A1 | 5/2016 | Rogers |
| 2017/0057711 | A1 | 3/2017 | Miller |
| 2018/0098913 | A1 | 4/2018 | Vassallo |
| 2018/0207061 | A1 | 7/2018 | Fox |
| 2019/0276201 | A1 | 9/2019 | French |
| 2021/0276769 | A1 | 9/2021 | Dzurik |
| 2023/0339658 | A1 | 10/2023 | Gift |

FOREIGN PATENT DOCUMENTS

| | | | |
|---|---|---|---|
| WO | 2007027567 | | 3/2007 |
| WO | 2008065879 | A1 | 6/2008 |
| WO | 2009133754 | A1 | 11/2009 |
| WO | 2013003293 | | 1/2013 |
| WO | 2018122019 | | 7/2018 |
| WO | 2019090079 | A1 | 5/2019 |
| WO | 2020131669 | A1 | 6/2020 |

OTHER PUBLICATIONS

Office Action dated Sep. 27, 2019 for U.S. Appl. No. 15/835,523 (pp. 1-8).

International (PCT) Search Report and Written Opinion for PCT/US23/19233 dated Jul. 19, 2023, BP-585 PCT ||, 9 pages.

Indian First Examination Report for Indian Patent App. No. 202117040342 dated Jan. 12, 2023, BP-540 IN ||, 6 pages.

European Search Report for European App. No. EP20766543.1 dated Jan. 24, 23, BP-540 EP ||, 9 pages.

International (PCT) Search Report and Written Opinion for PCT/U.S. Pat. No. 2020020654 dated May 6, 2020, BP-542 PCT ||, 10 pages.

International (PCT) Search Report and Written Opinion for PCT/US2020/020659 dated May 7, 2020, BP-544 PCT ||, 10 pages.

International (PCT) Search Report and Written Opinion for PCT/US2020/020650 dated May 7, 2020, BP-540 PCT ||, 16 pages.

Office Action dated Dec. 13, 2021 for U.S. Appl. No. 16/806,284, BP-540 US-U || (pp. 1-10).

Office Action (Non-Final Rejection) dated Feb. 18, 2022 for U.S. Appl. No. 16/806,462, BP-542 US-U || (pp. 1-9).

International (PCT) Search Report and Written Report for PCT/US22/42150 dated Nov. 23, 2022, BP-579 PCT ||, 12 pages.

Office Action (Non-Final Rejection) dated Aug. 15, 2024 for U.S. Appl. No. 18/303,167 (pp. 1-11).

PEDIATRIC DOSING DISPENSER

PRIORITY CLAIM

This application claims priority under 35 U.S.C. § 119 (e) to U.S. Provisional Application Ser. No. 63/239,575, filed Sep. 1, 2021, U.S. Provisional Application Ser. No. 63/333,247, filed Apr. 21, 2022, and U.S. Provisional Application Ser. No. 63/339,078, filed May 6, 2022, each of which are expressly incorporated by reference herein.

BACKGROUND

The present disclosure relates to dosing dispensers for mounting on the top of bottles, or other containers, and in particular, to a dosing dispenser including a body portion coupled to a container and a flip-top cap coupled to the body portion. More particularly, the present disclosure relates to a dosing dispenser with a child-safety lock.

SUMMARY

In accordance with the present disclosure, a dosing dispenser includes a body portion and a flip-top cap coupled to the body portion to conceal a discharge aperture formed in the body portion. The body portion is configured to be mounted to a filler neck of a container to form a package and to control discharge of product out of the package. The discharge aperture is configured to accept a fluid-transfer tip of a syringe that is used to withdraw liquid from the container.

In illustrative embodiments, the dosing dispenser is configured to change from an opened arrangement to a closed arrangement. In the opened arrangement, the flip-top cap is pivoted about a flip-top pivot axis away from the body portion and is spaced apart from the discharge aperture. In the closed arrangement, the flip-top cap is pivoted about the flip-top pivot axis into engagement with the body portion to overlie and block access to the discharge aperture.

In illustrative embodiments, the dosing dispenser further includes a child-resistant lock. The child-resistant lock is configured to retain the flip-top cap in the closed arrangement to provide means for blocking unauthorized use and withdrawal of liquid from container of the package while the flip-top cap is in the closed arrangement. The child resistant lock includes a lock tab coupled to the flip-top cap and a tab retainer coupled to the body portion. The lock tab includes a sloped ramp surface and a motion-blocking surface. The tab retainer includes an actuator pad and a tab anchor coupled to an upper end of the actuator pad. The motion-blocking surface of the lock tab is configured to engage a lower surface of the tab anchor to restrict movement of the dosing dispenser from the closed arrangement to the opened arrangement.

In illustrative embodiments, the child-resistant lock may further include a cap-opening lip coupled to the flip-top cap and a vertically-extending lip coupled to the body portion. The cap-opening lip is coupled to an outer surface of a side wall of the flip-top cap and is spaced apart axially from the upper end of the actuator pad relative to a central axis of the body portion when the dosing dispenser is in the closed arrangement. The vertically-extending lip is positioned to block access to an interface between a lower end of the flip-top cap and the body portion. The cap-opening lip and the vertically-extending lip each increase child resistance to opening the flip-top cap.

BRIEF DESCRIPTION OF THE DRAWINGS

The detailed description particularly refers to the accompanying figures in which.

DETAILED DESCRIPTION

A first embodiment of a package 10 in accordance with the present disclosure is shown in FIGS. 1-13. A second embodiment of a package 210 is shown in FIGS. 14-26. A third embodiment of a package 310 is shown in FIGS. 27-36.

Figure 1:
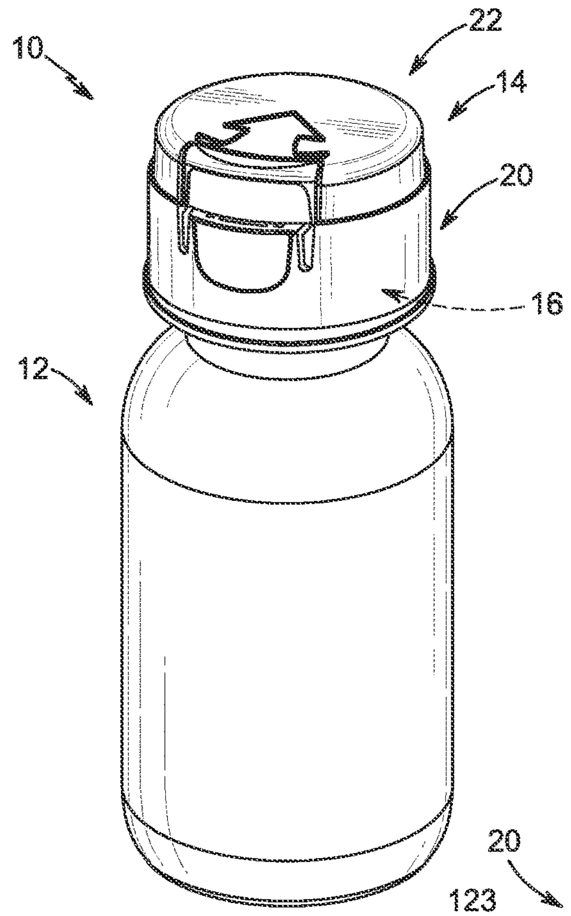
FIG. 1 is a perspective view of a package, in accordance with the present disclosure, including a dosing dispenser coupled to a child-resistant lock.

The package 10 in accordance with the present disclosure includes a container 12, a dosing dispenser 14 coupled to a filler neck 16 of container 12, and a child-resistant lock 18 as shown, for example, in FIG. 1. Dosing dispenser 14 includes body portion 20 adapted to be mounted on container 12 and includes a flip-top cap 22 that is pivotably coupled to body portion 20 to conceal a discharge aperture 24. Discharge aperture 24 is configured to accept a fluid-transfer tip of a syringe that is used to withdraw liquid from container 12.

Figure 7:
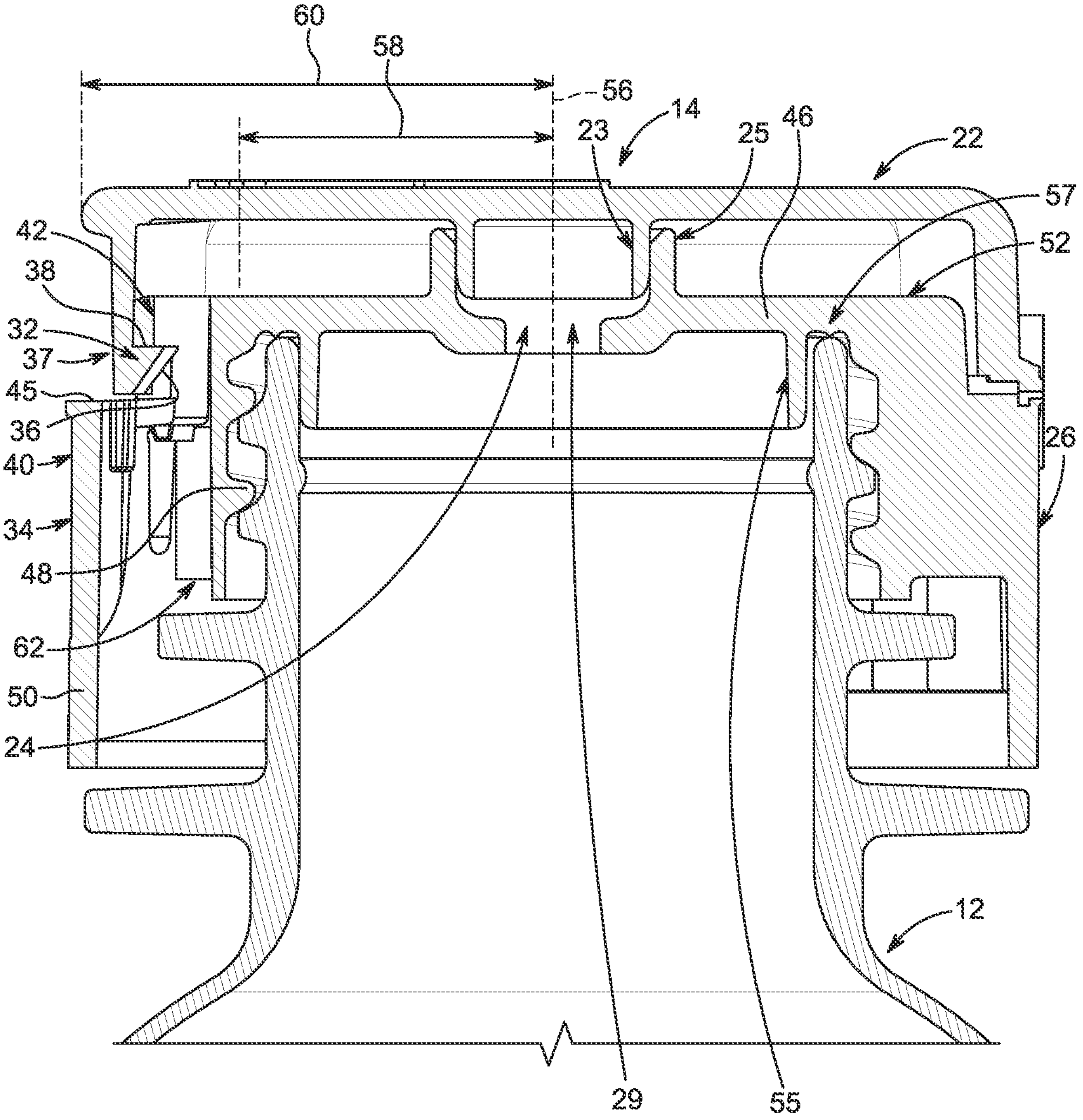
FIG. 7 is a sectional view of the dosing dispenser of FIG. 1 showing the flip-top cap in the closed arrangement.
Figure 8:
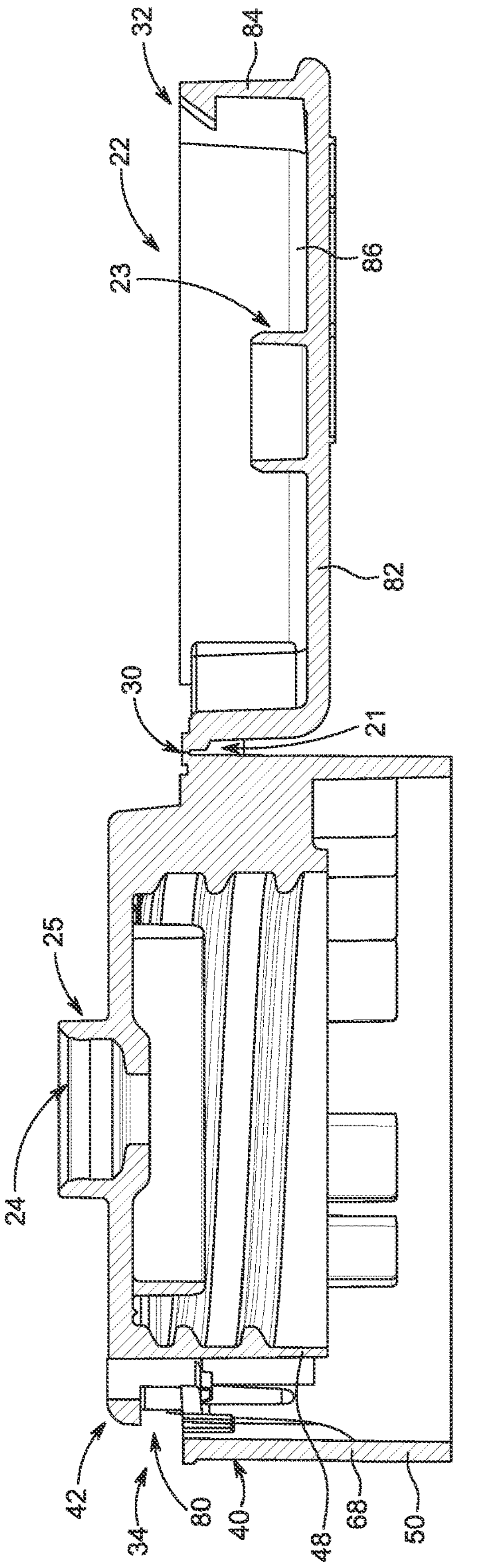
FIG. 8 is a sectional view of the dosing dispenser of FIG. 1 showing the flip-top cap in the opened arrangement.

Dosing dispenser 14 is configured to change from an opened arrangement, where flip-top cap 22 is pivoted about a flip-top pivot axis 30 away from body portion 20, and a closed arrangement, where flip-top cap 22 is pivoted about flip-top pivot axis 30 into engagement with body portion 20 to block access to discharge aperture 24. Flip-top cap 22 may be integral or unitary with body portion 20 at flip-top pivot axis 30 to provide a hinge 21 therebetween. Child-resistant lock 18 is configured to retain flip-top cap 22 in the closed arrangement to provide means for blocking unauthorized use and withdrawal of liquid from container 12 of the package 10 while flip-top cap 22 is in the closed arrangement. Flip-top cap 22 may include a plug 23 that is inserted into discharge aperture 24 in the closed arrangement to seal against surfaces defining discharge aperture 24 as shown in FIG. 7. Illustratively, discharge aperture 24 is at least partially defined by a discharge nozzle 25 that extends upwardly toward flip-top cap 22 and that receives the plug 23 in the closed arrangement.

Figure 3:
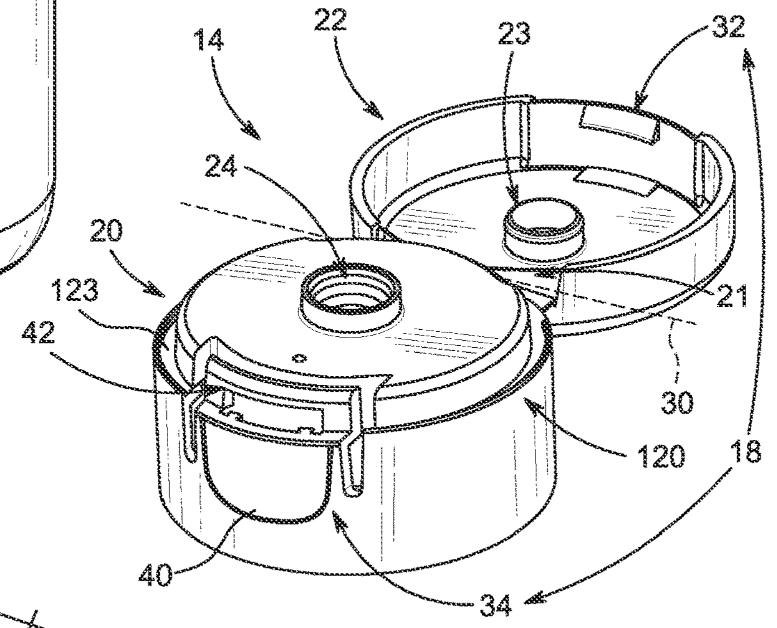
FIG. 3 is a perspective view of the dosing dispenser of FIG. 1 showing the flip-top cap in an opened arrangement.
Figure 2:
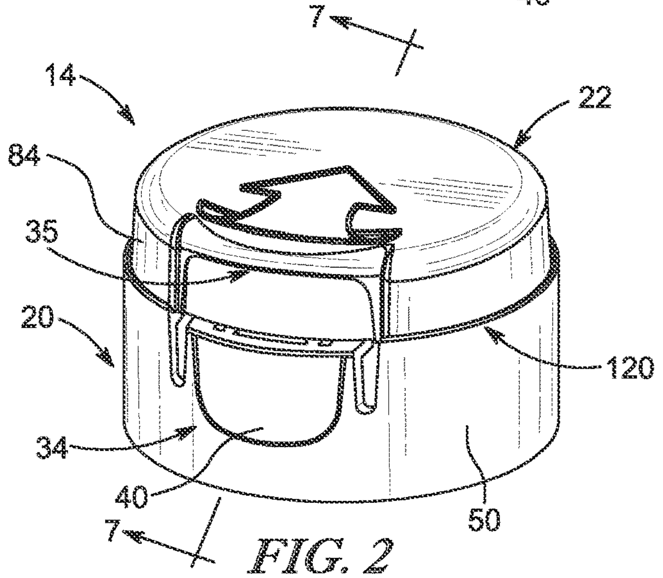
FIG. 2 is a perspective view of the dosing dispenser of FIG. 1 including a flip-top cap in a closed arrangement.

Child resistant lock 18 includes a lock tab 32 coupled to flip-top cap 22 and a tab retainer 34 coupled to body portion 20, as shown in FIGS. 2 and 3. Lock tab 32 includes a sloped ramp surface 36 and a motion-blocking surface 38. Tab retainer 34 includes an actuator pad 40 and a tab anchor 42 coupled to an upper end of actuator pad 40. Motion-blocking surface 38 of lock tab 32 is configured to engage a lower surface of tab anchor 42 to restrict movement of dosing dispenser 14 from the closed arrangement to the opened arrangement as shown in FIG. 7.

Figure 4:
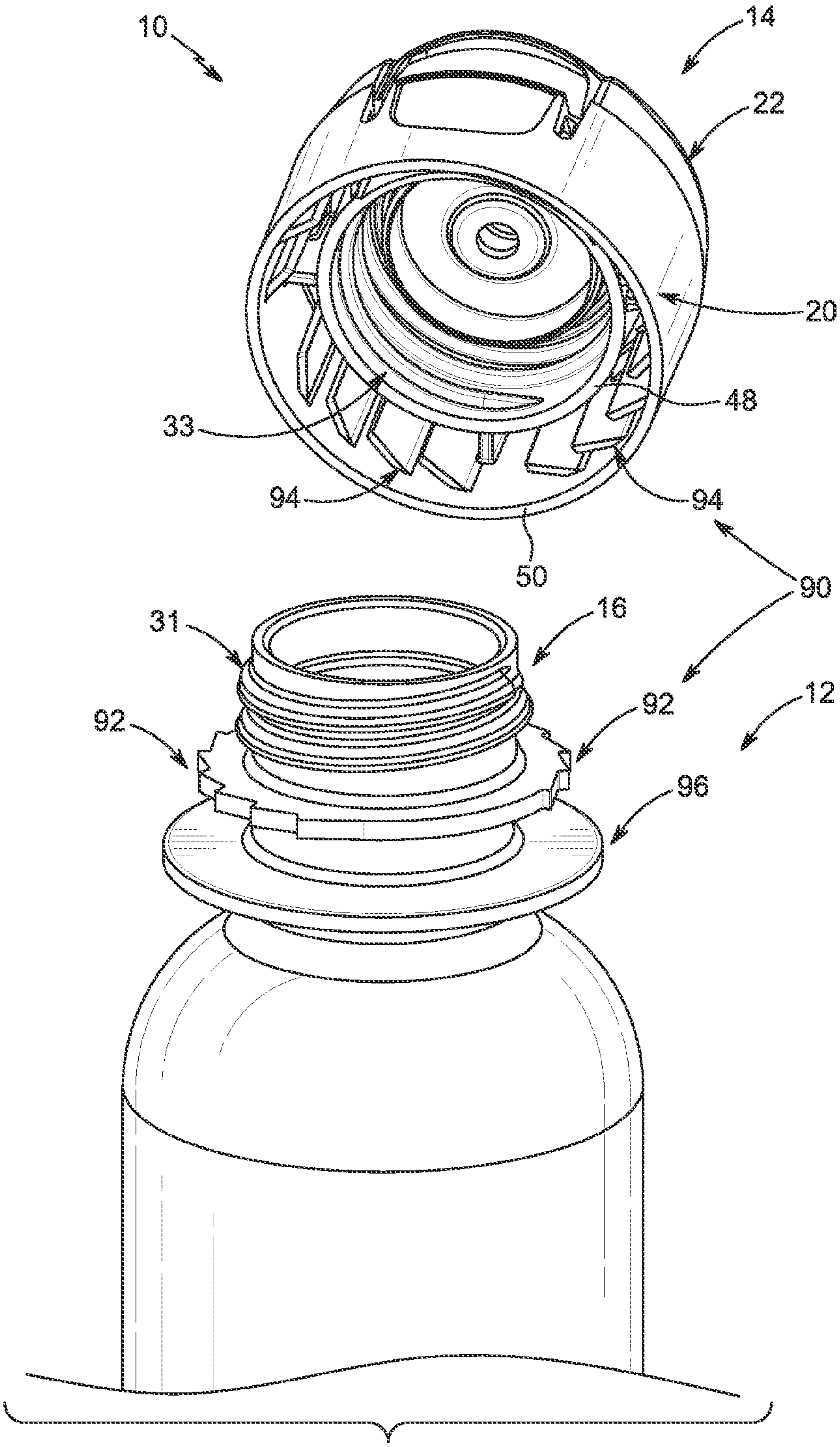
FIG. 4 is a perspective view of the dosing dispenser of FIG. 1.

Dosing dispenser 14 may initially be screwed onto filler neck 16 using threads 31, 33 as shown in FIG. 4. Package 10 further includes a closure retention system 90 configured to retain dosing dispenser 14 to container 12 after full installation on container 12 to block unintentional removal of dosing dispenser 14 from container 12 by a child, for example. Closure retention system 90 includes a plurality of ratchet teeth 92 coupled to container 12 and a plurality of ratchet fins 94 coupled to dosing dispenser 14 as shown in FIG. 4. The plurality of ratchet teeth 92 are spaced below threads 31 on filler neck 16 and are shaped to allow rotation of dosing dispenser 14 in a clockwise, installation direction. The plurality of ratchet teeth 92 and the plurality of ratchet fins 94 cooperate with one another to block rotation of dosing dispenser 14 in a counterclockwise, removal direction opposite the clockwise, installation direction. Container 12 further includes a shroud ring 96 located below the plurality of ratchet teeth 92. Shroud ring 96 is positioned directly below a bottom edge of body portion 20 to block access to the plurality of ratchet fins 94 when dosing dispenser 14 is fully installed on container 12.

Figure 5:
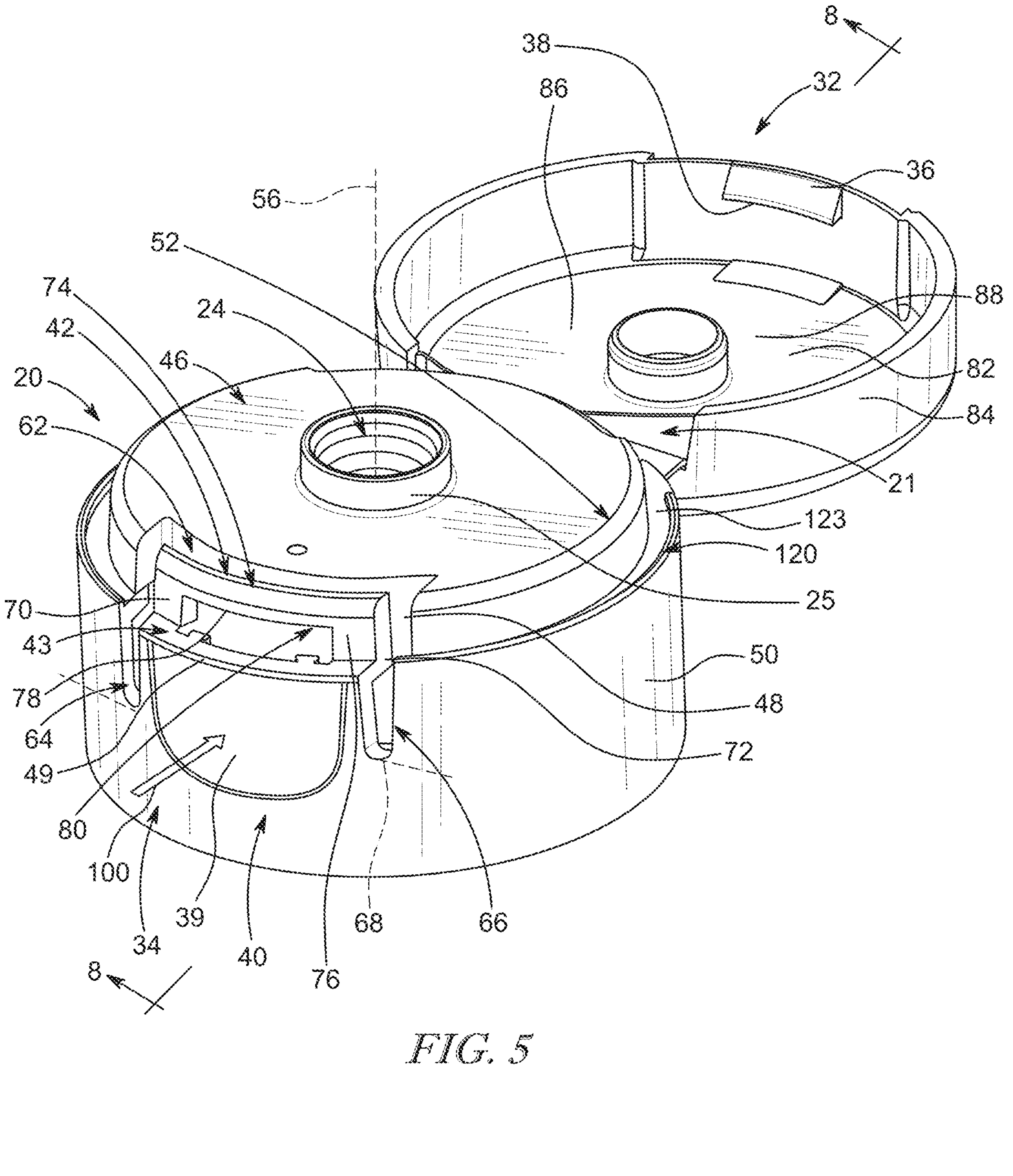
FIG. 5 is a perspective view of the dosing dispenser of FIG. 1.
Figure 6:
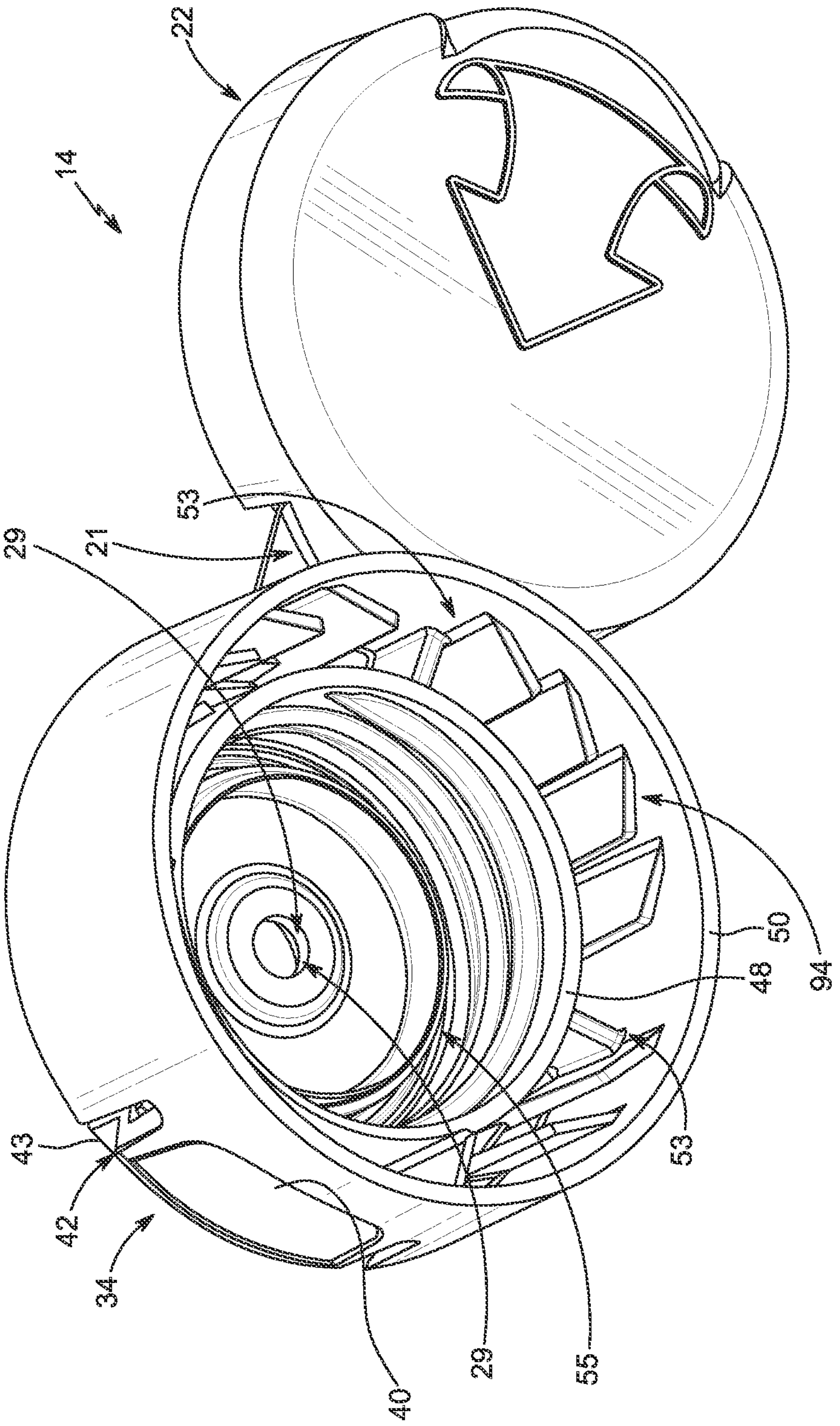
FIG. 6 is a perspective view of the dosing dispenser of FIG. 1.

Body portion 20 of dosing dispenser 14 includes a top wall 46, a first annular side wall 48, a second side wall 50, and a rim connector 52 as shown in FIGS. 4 and 5. Top wall 46 is formed to include discharge aperture 24 and central axis 56 extends generally through the center of top wall 46 and discharge aperture 24. An inside surface of first side wall 48 is threaded and engages with corresponding threads on filler neck 16 to retain dosing dispenser 14 to container 12. Second side wall 50 is coupled to first side wall 48 by rim connector 52 and a plurality of reinforcement ribs 53. Tab anchor 42 is coupled to second side wall 50.

The first side wall 48 is spaced apart from central axis 56 a first distance 58 while the second side wall 50 is spaced apart from axis 56 a second distance 60 that is greater than the first distance 58. A gap 62 is formed radially between the first side wall 48 and the second side wall 50. Rim connector 52 interconnects upper ends of the first side wall 48 and the second side wall 50 to provide the gap 62 therebetween.

The first side wall 48 extends annularly around axis 56 while only a lower portion of the second side wall 50 extends annularly around axis 56. The second side wall 50 includes a first slot 64 and a second slot 66 spaced circumferentially apart from the first slot 64 relative to the axis 56 to provide actuator pad 40 between the first slot 64 and the second slot 66 as shown in FIGS. 4 and 5. A lower end of each slot 64, 66 provides a horizontal actuator pivot axis 68. An upper end of each slot 64, 66, is unbounded by any part of body portion 20. An inward force 100 on actuator pad 40 causes at least a portion of actuator pad 40 and tab anchor 42 to pivot and/or flex about actuator pivot axis 68 to separate tab anchor 42 from motion-blocking surface 38 of lock tab 32 so that flip-top cap 22 is free to pivot about axis 30 from a closed arrangement to an opened arrangement as shown in FIGS. 3 and 5.

Tab anchor 42 includes a pair of circumferentially spaced support posts 70, 72 and an anchor beam 74 extending between and interconnecting each support post 70, 72. Each support post 70, 72 is coupled to an upper end of actuator pad 40 for movement therewith in response to the inward force 100. Anchor beam 74 is spaced vertically from an upper end of actuator pad 40 to provide a tab-receiving space 80 therebetween that receives lock tab 32 when flip-top cap 22 is in the closed arrangement as shown in FIG. 7.

Anchor beam 74 includes a sloped upper surface 76 and a motion-blocking surface 78. Sloped ramp surface 36 of lock tab 32 engages and rides along sloped upper surface 76 of anchor beam 74 as flip top cap 22 is moved to the closed arrangement. At least one of flip-top cap 22 and tab anchor 42 flex as the sloped ramps 36, 76 engage and move past one another as flip-top cap 22 is fully closed. Tab anchor 34 and flip-top cap 22 may at least partially unflex upon arrival in the closed arrangement so that lock tab 32 extends into tab-receiving space 80 and motion-blocking surfaces 38, 78 face toward one another to block flip-top cap 22 from rotating about pivot axis 30.

Figure 12:
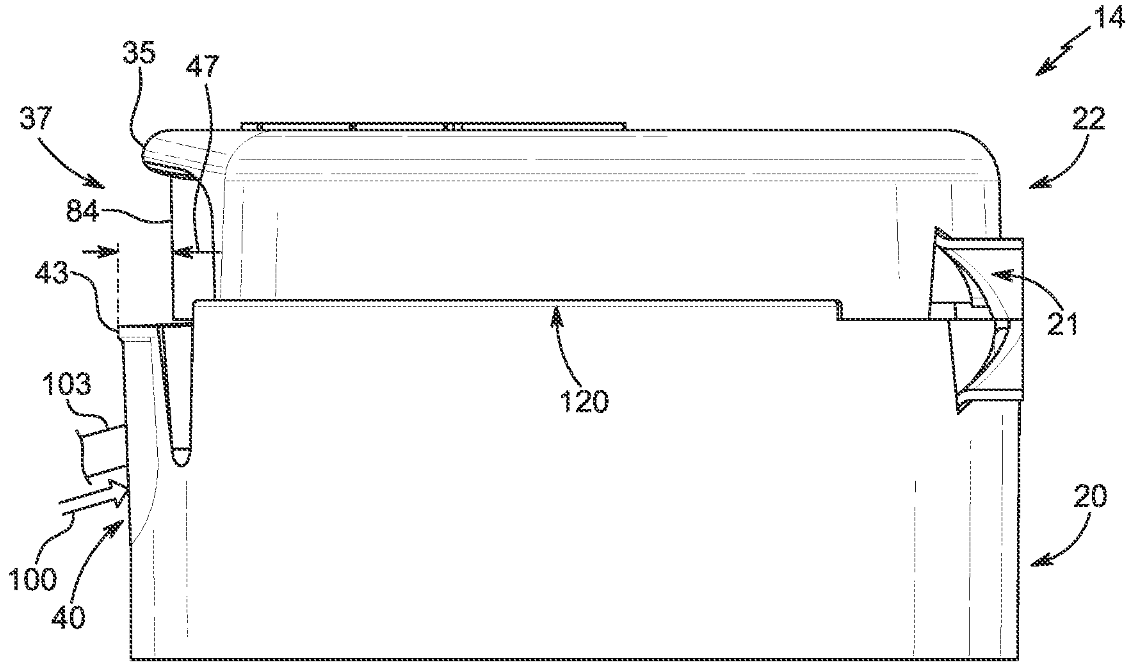
FIG. 12 is a side view of the dosing dispenser of FIG. 1 showing a child's tooth engaging an actuator pad coupled to the dosing dispenser.
Figure 13:
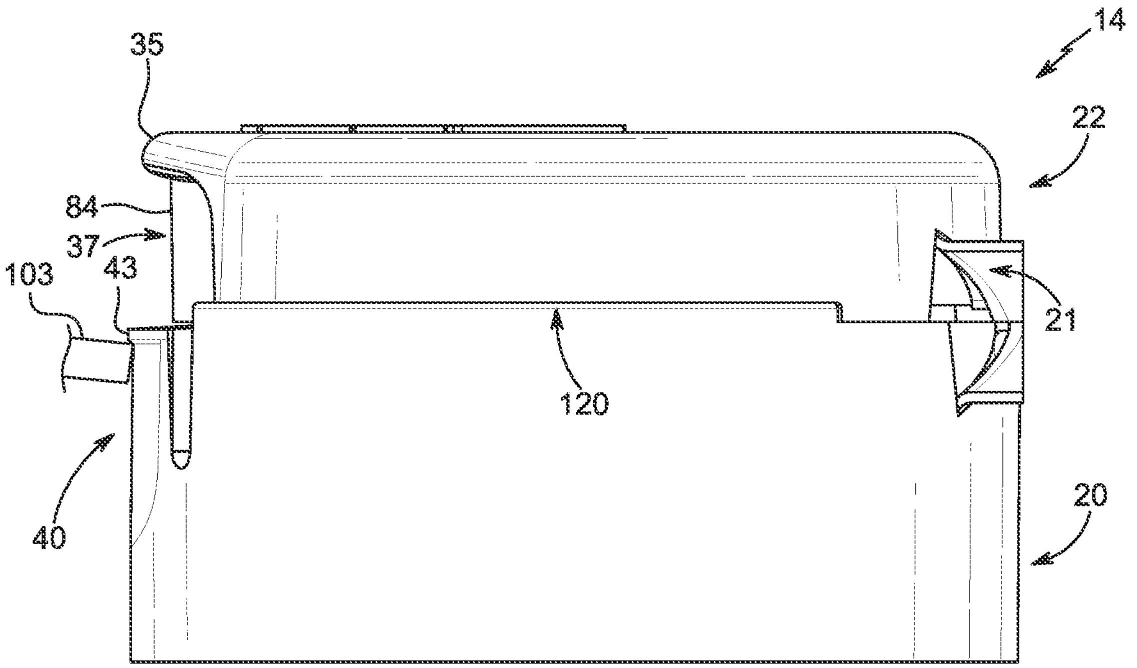
FIG. 13 is a side view of the dosing dispenser of FIG. 1 showing the child's tooth engaging a cap-opening lip coupled to the dosing dispenser.

Child-resistant lock 18 may further include a cap-opening lip 35 coupled to flip-top cap 22 as shown in FIGS. 7, 12, and 13. Cap-opening lip 35 is coupled to an outer surface of a side wall 84 of flip-top cap 22 and is spaced apart axially from the upper end of actuator pad 40 relative to central axis 56 of body portion 20, as shown in FIG. 7, when dosing dispenser 14 is in the closed arrangement. A finger-receiving space 37 is defined vertically between the upper end of actuator pad 40 and cap-opening lip 35. Thus, side wall 84 of flip top cap 22 is located radially inward of radially-outer portions of both cap-opening lip 35 and actuator pad 40. In some embodiments, an upper end of cap-opening lip 35 is axially aligned with an upper end of top wall 82 of flip-top cap 22.

To change flip-top cap 22 from the closed arrangement to the opened arrangement, an inward force 100 is first applied to actuator pad 40. Subsequently, a user's finger may enter finger-receiving space 37 and engage lower surfaces of cap-opening lip 35. While actuator pad 40 is deformed, an upward lifting force can be applied to cap-opening lip 35 to change flip-top cap 22 from the closed arrangement to the opened arrangement.

Spacing between the upper end of actuator pad 40 and cap-opening lip 35 blocks a child, by way of example, from biting down onto actuator pad 40 to disengage the tab anchor 42 from lock tab 32 while also applying the upward lifting force 102 to cap-opening lip 35 as suggested in FIGS. 12 and 13. It was found that children may use their teeth 103 to depress actuator pads in packages and immediately apply leverage with their teeth to a bottom edge of a flip-top cap to open the package. In the illustrated embodiment, if a child uses its teeth 103 to apply an inward force 100 to actuator pad 40 and disengage lock tab 32 from tab anchor 42, the child stops applying the inward force 100 to actuator pad 40 by the time its teeth pull up on cap-opening lip 35. Once the inward force 100 is not applied to actuator pad 40, tab anchor 42 reengages lock tab 32 to lock dosing dispenser 14 in the closed arrangement before any upward force is applied to flip-top cap 22. In this way, actuator pad 40 and cap-opening lip 35 of child restraint lock 18 provides two-handed opening means which the child may be unaware of to block the child from opening flip-top cap 22.

Actuator pad 40 includes a radially-extending flange 43 coupled to an outer surface 39 of actuator pad 40 as shown in FIG. 5. An upper end of radially-extending flange 43 is axially aligned with the upper end of actuator pad 40 relative to central axis 56. An outer surface 49 of radially-extending flange 43 is radially outward of side wall 84 of flip-top cap 22 and second side wall 50 of body portion 20. Radially-extending flange 43 provides a ledge that engages a child's tooth 103 to block the child's tooth 103 from reaching a bottom surface of side wall 84 of flip-top cap 22 and cap-opening lip 35 while actuator pad 40 is depressed. Radially-extending flange 43 has an upper surface 45 that interfaces with a lower end of side wall 84 of flip-top cap 22 in the closed arrangement as shown in FIG. 7. Radially-extending flange 43 extends radially outward further from central axis 56 than side wall 84. Upper surface 45 of radially-extending flange 43 extends radially outward away from side wall 84 a distance 47 that may be greater than or equal to a travel distance of tab retainer 34. Thus, even when tab retainer 34 is fully deformed, a portion of radially-extending flange 43 may protrude outwardly past side wall 84 of flip-top cap to block a child's tooth 103 from engaging a lower end of side wall 84 and prying flip-top cap 22 open.

Figure 11:
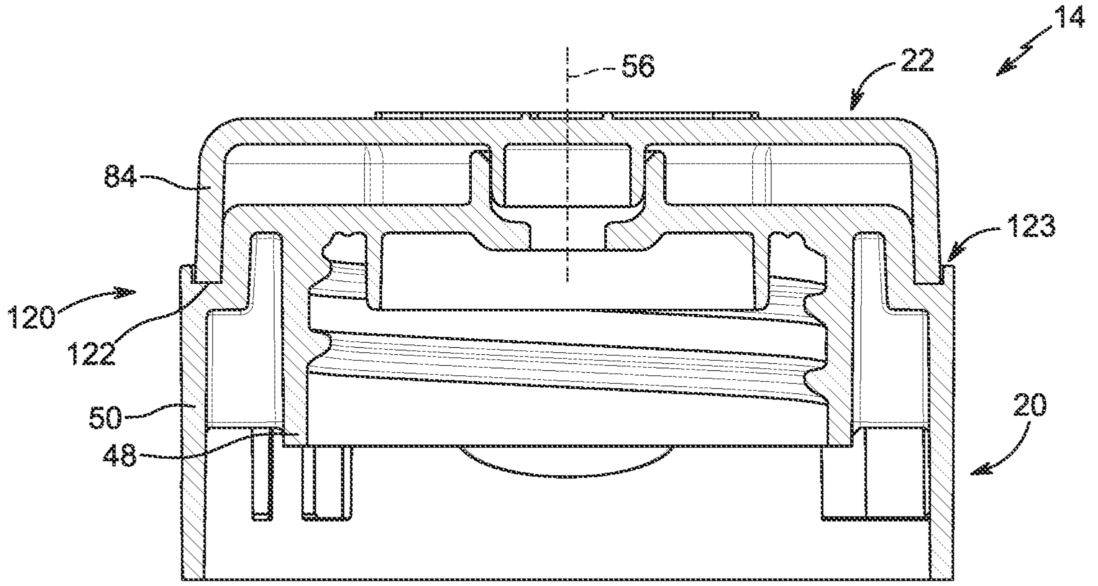
FIG. 11 is a sectional view of the dosing dispenser of FIG. 1.

Child resistant lock 18 may further include an axially-extending lip 120 positioned at an interface between a lower end of flip-top cap 22 and body portion 20 as shown in FIGS. 7 and 11. Vertically-extending lip 120 extends along all or a portion of the second side wall 50. Vertically-extending lip 120 extends axially outward from second side wall 50 of body portion 20 relative to the central axis 56 to define a channel 123 which receives a lower end of side wall 84 of flip-top cap 22 in the closed arrangement. An upper end 125 of vertically-extending lip 120 is positioned above a parting-line 122 defined between flip-top cap 22 and body portion 20 to block objects, such as a fingernail or tooth of a child, from extending into the parting-line 122 to pry flip-top cap 22 open without pressing actuator pad 40. It was found that children may identify parting-lines in packages and wedge their fingernails or teeth into the parting-lines to open the package. Vertically-extending lip 120 provides a faux crack location at an upper end of the vertically-extending lip 120 spaced apart vertically from parting line 122 to pick and pry at. Children may become distracted from chasing this false positive and fail to enter the package 10.

Vertically-extending lip 120 is spaced apart from central axis 56 by a first radius R1 and, in the open arrangement, side wall 84 of flip-top cap 22 is spaced apart from a second central axis 56' by a second radius R2. In the closed arrangement, second central axis 56' is central axis 56 so that side wall 84 is also spaced apart from central axis 56 by second radius R2. The second radius R2 is less than first radius R1 so that side wall 84 resides radially inward of vertically-extending lip 120 in channel 123 in the closed arrangement.

Flip-top cap 22 further includes a top wall 82, a side wall 84, and a pair of reinforcement ribs 86, 88 coupled to a lower surface of top wall 82 facing toward body portion 20 in the closed arrangement. Top wall 82 completely covers top wall 46 of body portion 20 in the closed arrangement. Side wall 84 has an inside diameter that corresponds with an outer diameter of a portion of body portion 20 to receive the portion of body portion 20 in the closed arrangement. Reinforcement ribs 86, 88 extend from a forward end of flip-top cap 22 to a rear end of flip-top cap 22 to reduce flexing of top wall 82 when flip-top cap 22 is being closed so that plug 23 can be inserted into discharge aperture 24 and provide a seal while reducing a thickness of top wall 82. Reinforcement ribs 86, 88 are curved to extend around and accommodate an outer diameter of discharge nozzle 25.

Some comparable packages (not shown) may require a liner, such as a removable seal, to initially block access to a product held by container and removal of the product from the container until the liner is removed or broken. Illustratively, plug 23 and child-resistant lock 18 allows package to be linerless or free of a liner made of a film, foil, combinations thereof, or any suitable alternative. Plug 23 provides a reusable seal to block access to product in container 12 when flip-top cap 22 is closed. Dosing dispenser 14 further includes a container plug seal 55 that extends into filler neck 16 and a rim seal 57 that engages an upper end of filler neck 16.

Figure 9:
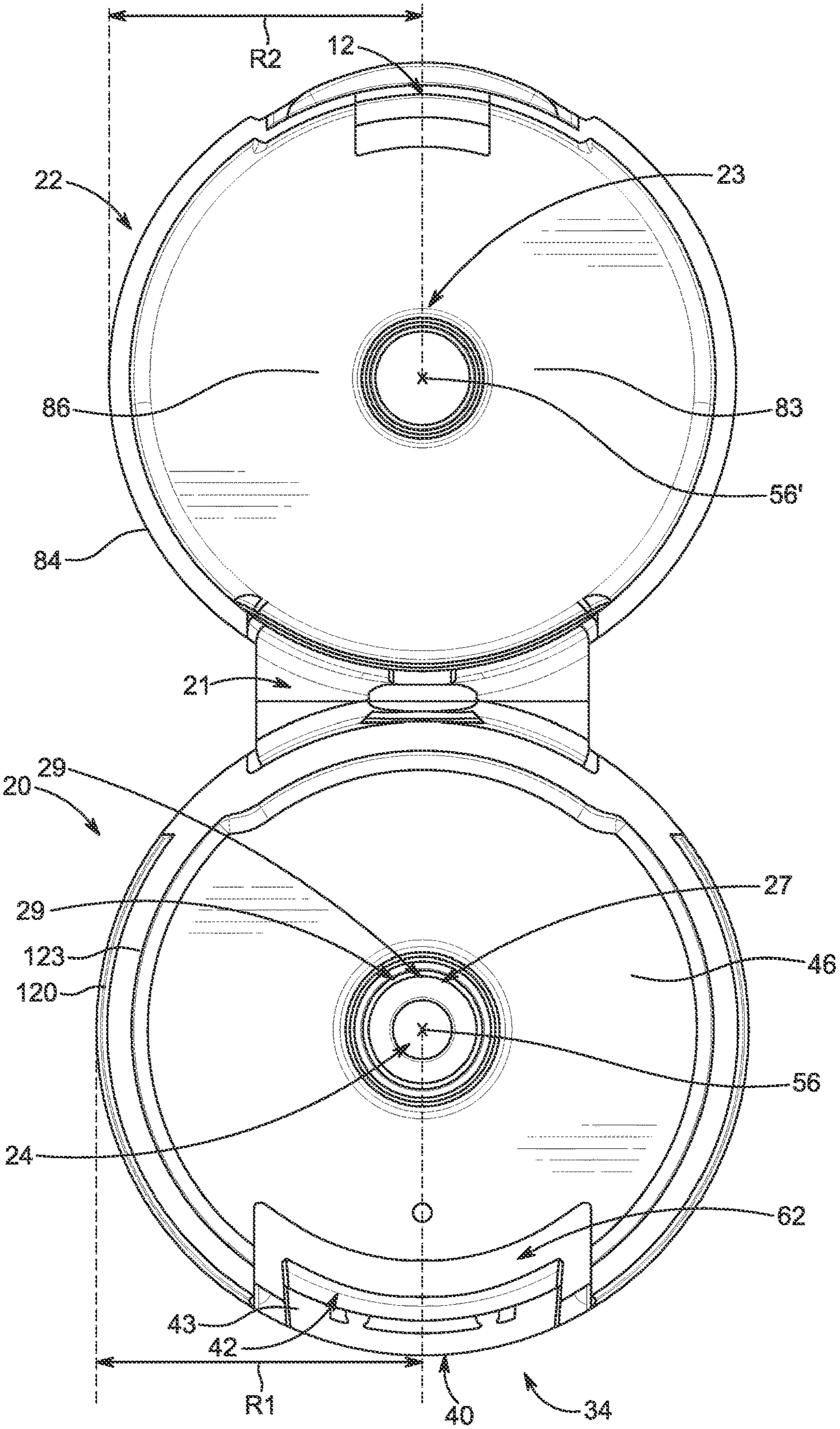
FIG. 9 is a top plane view of the dosing dispenser of FIG. 1 showing the flip-top cap in the opened arrangement.
Figure 10:
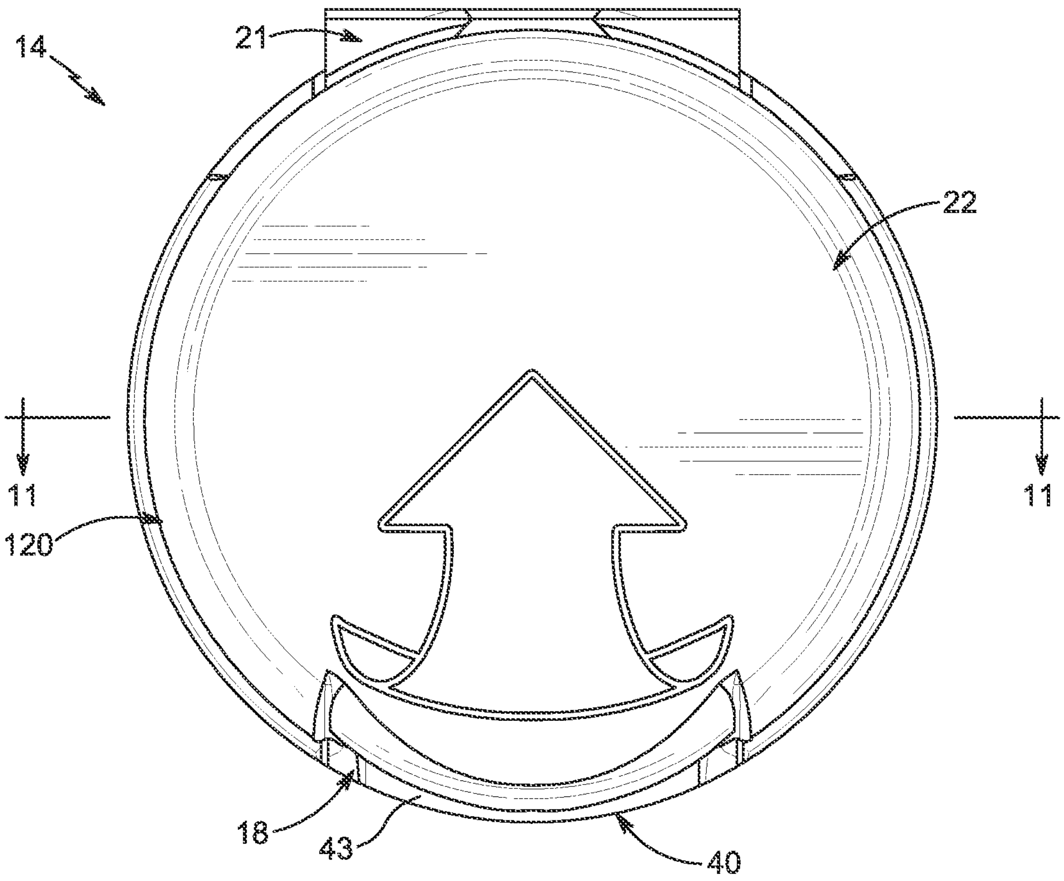
FIG. 10 is a top plane view of the dosing dispenser of FIG. 1 showing the flip-top cap in the closed arrangement.

In one embodiment, discharge nozzle 25 is sized and shaped to be used without a syringe to withdraw product from container 12, as shown in FIG. 9. Discharge nozzle 25 includes a nozzle side wall 27 and an inlet ring 29 coupled to an inside surface of nozzle side wall 27. Inlet ring 29 is spaced below an upper opening to discharge nozzle 25 and has a smaller inner diameter than the discharge nozzle 25 to block insertion of a syringe. Instead, dosing dispenser 14 may be used with container 12 to release liquid product upon application of a squeezing force on container to force liquid product out of the discharge aperture 24.

Figure 14:
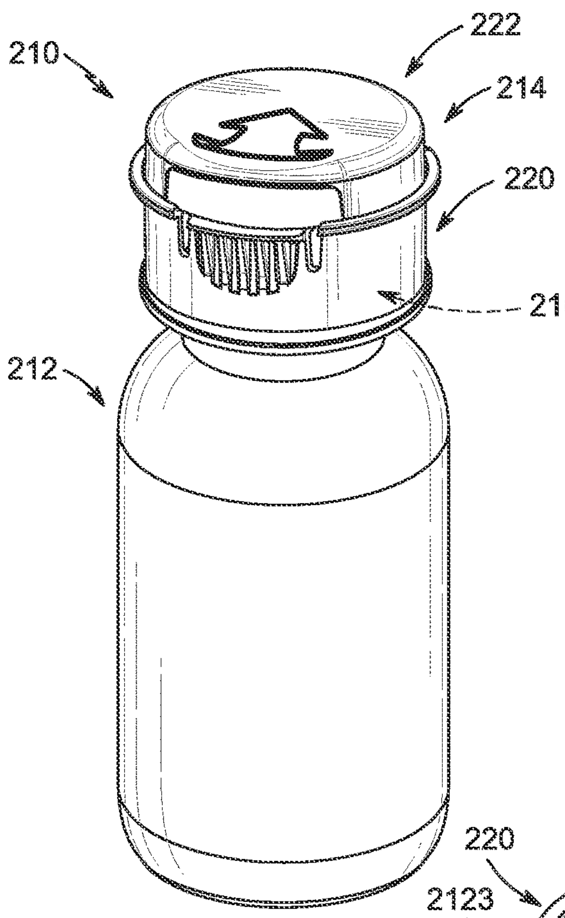
FIG. 14 is a perspective view of a package, in accordance with another embodiment of the present disclosure, including a dosing dispenser coupled to a child-resistant lock.

A package 210 in accordance with another the present disclosure includes a container 212, a dosing dispenser 214 coupled to a filler neck 216 of container 212, and a child-resistant lock 218, as shown, for example, in FIG. 14. Dosing dispenser 214 includes body portion 220 adapted to be mounted on container 212 and includes a flip-top cap 222 that is pivotably coupled to body portion 220 to conceal a discharge aperture 224. Discharge aperture 224 is configured to accept a fluid-transfer tip of a syringe that is used to withdraw liquid from container 212.

Figure 20:
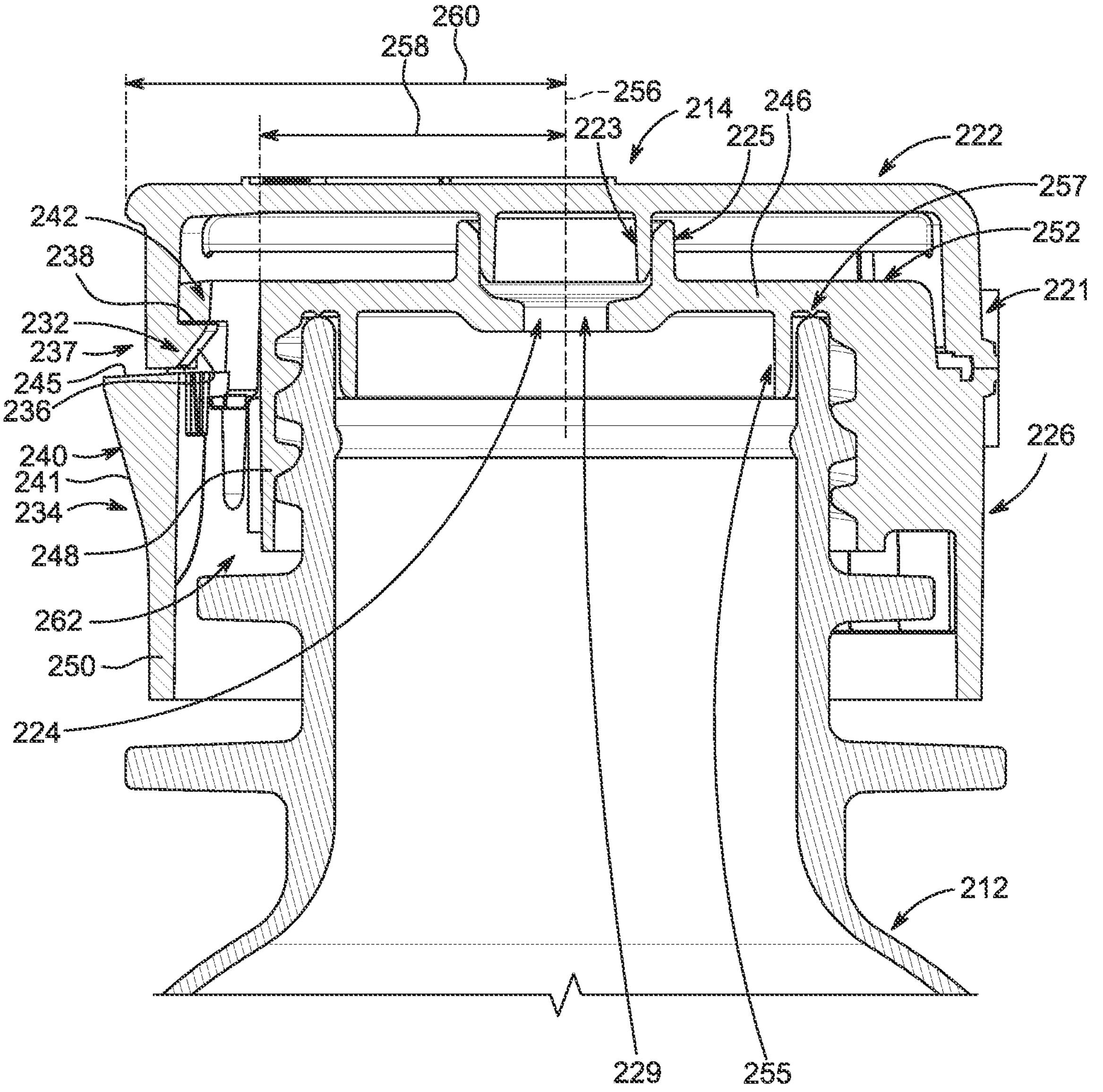
FIG. 20 is a sectional view of the dosing dispenser of FIG. 14 showing the flip-top cap in the closed arrangement.
Figure 21:
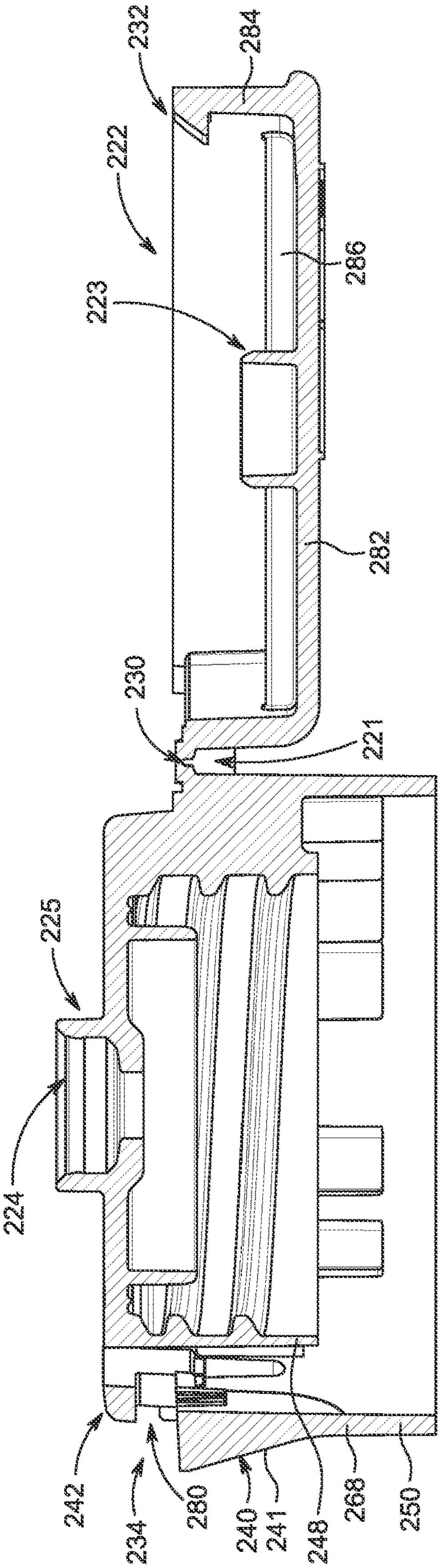
FIG. 21 is a sectional view of the dosing dispenser of FIG. 14 showing the flip-top cap in the opened arrangement.

Dosing dispenser 214 is configured to change from an opened arrangement, where flip-top cap 222 is pivoted about a flip-top pivot axis 230 away from body portion 220, and a closed arrangement, where flip-top cap 222 is pivoted about flip-top pivot axis 230 into engagement with body portion 220 to block access to discharge aperture 224. Flip-top cap 222 may be integral or unitary with body portion 220 at flip-top pivot axis 230 to provide a hinge 221 therebetween. Child-resistant lock 218 is configured to retain flip-top cap 222 in the closed arrangement to provide means for blocking unauthorized use and withdrawal of liquid from container 212 of the package 210 while flip-top cap 222 is in the closed arrangement. Flip-top cap 222 may include a plug 223 that is inserted into discharge aperture 224 in the closed arrangement to seal against surfaces defining discharge aperture 224 as shown in FIG. 20. Illustratively, discharge aperture 224 is at least partially defined by a discharge nozzle 225 that extends upwardly toward flip-top cap 222 and that receives the plug 223 in the closed arrangement.

Figure 16:
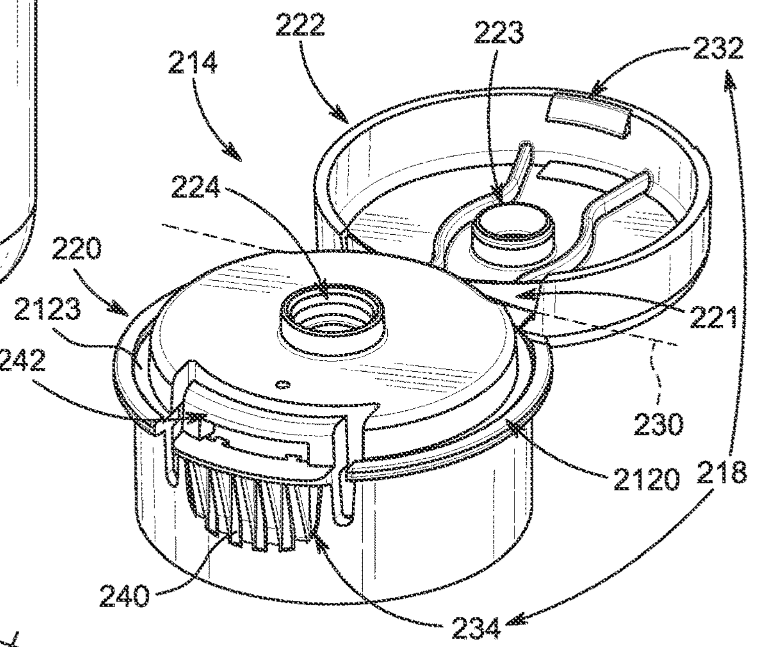
FIG. 16 is a perspective view of the dosing dispenser of FIG. 14 showing the flip-top cap in an opened arrangement.
Figure 15:
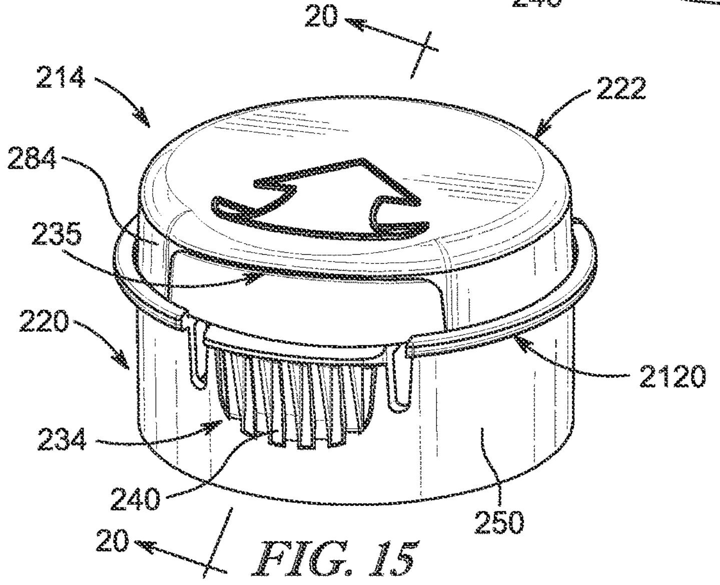
FIG. 15 is a perspective view of the dosing dispenser of FIG. 14 including a flip-top cap in a closed arrangement.

Child resistant lock 218 includes a lock tab 232 coupled to flip-top cap 222 and a tab retainer 234 coupled to body portion 220, as shown in FIGS. 15 and 16. Lock tab 232 includes a sloped ramp surface 236 and a motion-blocking surface 238. Tab retainer 234 includes an actuator pad 240 and a tab anchor 242 coupled to an upper end of actuator pad 240. Motion-blocking surface 238 of lock tab 232 is configured to engage a lower surface of tab anchor 242 to restrict movement of dosing dispenser 214 from the closed arrangement to the opened arrangement as shown in FIG. 20.

Figure 17:
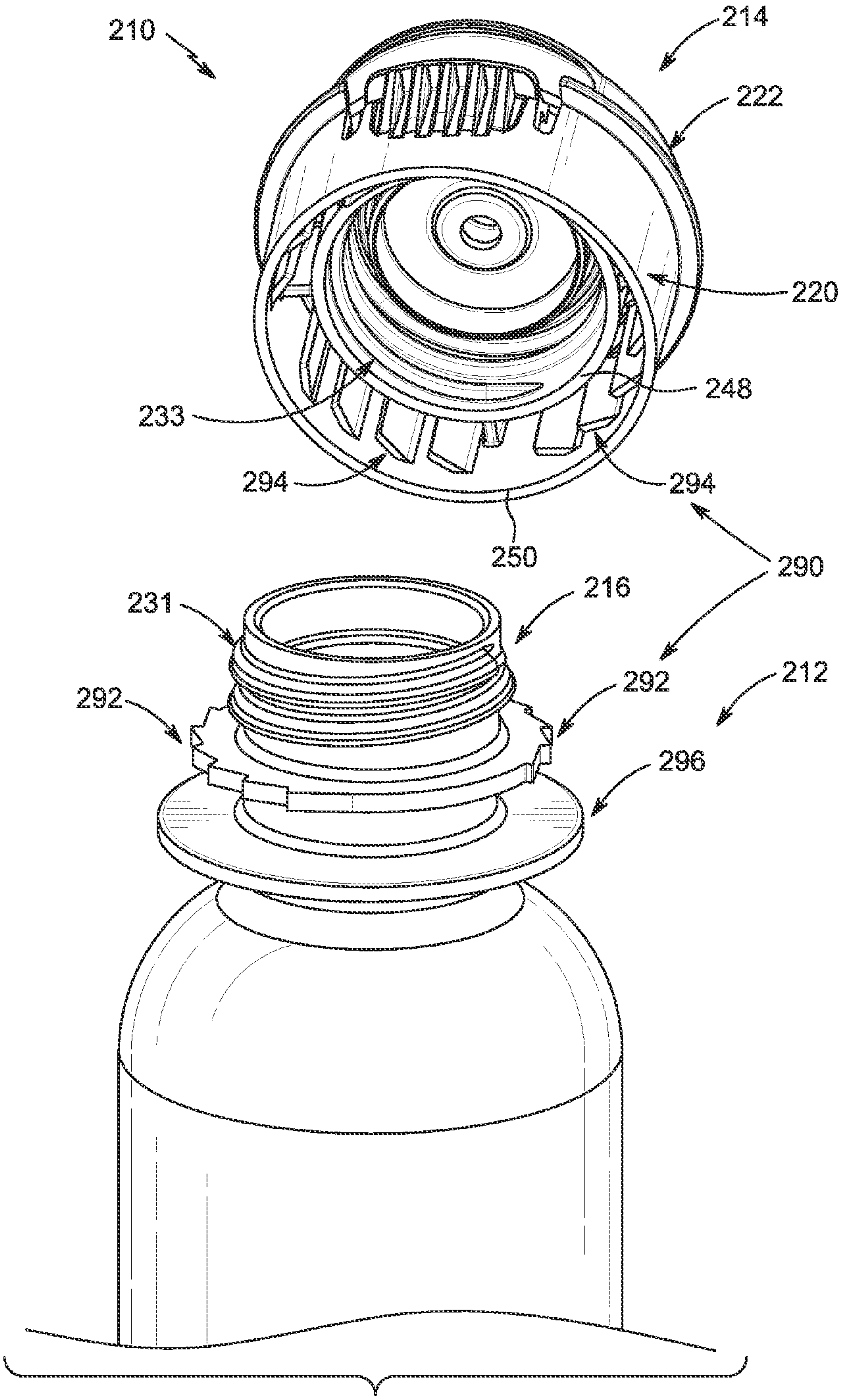
FIG. 17 is a perspective view of the dosing dispenser of FIG. 14.

Dosing dispenser 214 may initially be screwed onto filler neck 216 using threads 231, 233 as shown in FIG. 17. Package 210 further includes a closure retention system 290 configured to retain dosing dispenser 214 to container 212 after full installation on container 212 to block unintentional removal of dosing dispenser 214 from container 212 by a child, for example. Closure retention system 290 includes a plurality of ratchet teeth 292 coupled to container 212 and a plurality of ratchet fins 294 coupled to dosing dispenser 214 as shown in FIG. 17. The plurality of ratchet teeth 292 are spaced below threads 231 on filler neck 216 and are shaped to allow rotation of dosing dispenser 214 in a clockwise, installation direction. The plurality of ratchet teeth 292 and the plurality of ratchet fins 294 cooperate with one another to block rotation of dosing dispenser 214 in a counterclockwise, removal direction opposite the clockwise, installation direction. Container 212 further includes a shroud ring 96 located below the plurality of ratchet teeth 292. Shroud ring 296 is positioned directly below a bottom edge of body portion 220 to block access to the plurality of ratchet fins 294 when dosing dispenser 214 is fully installed on container 212.

Figure 18:
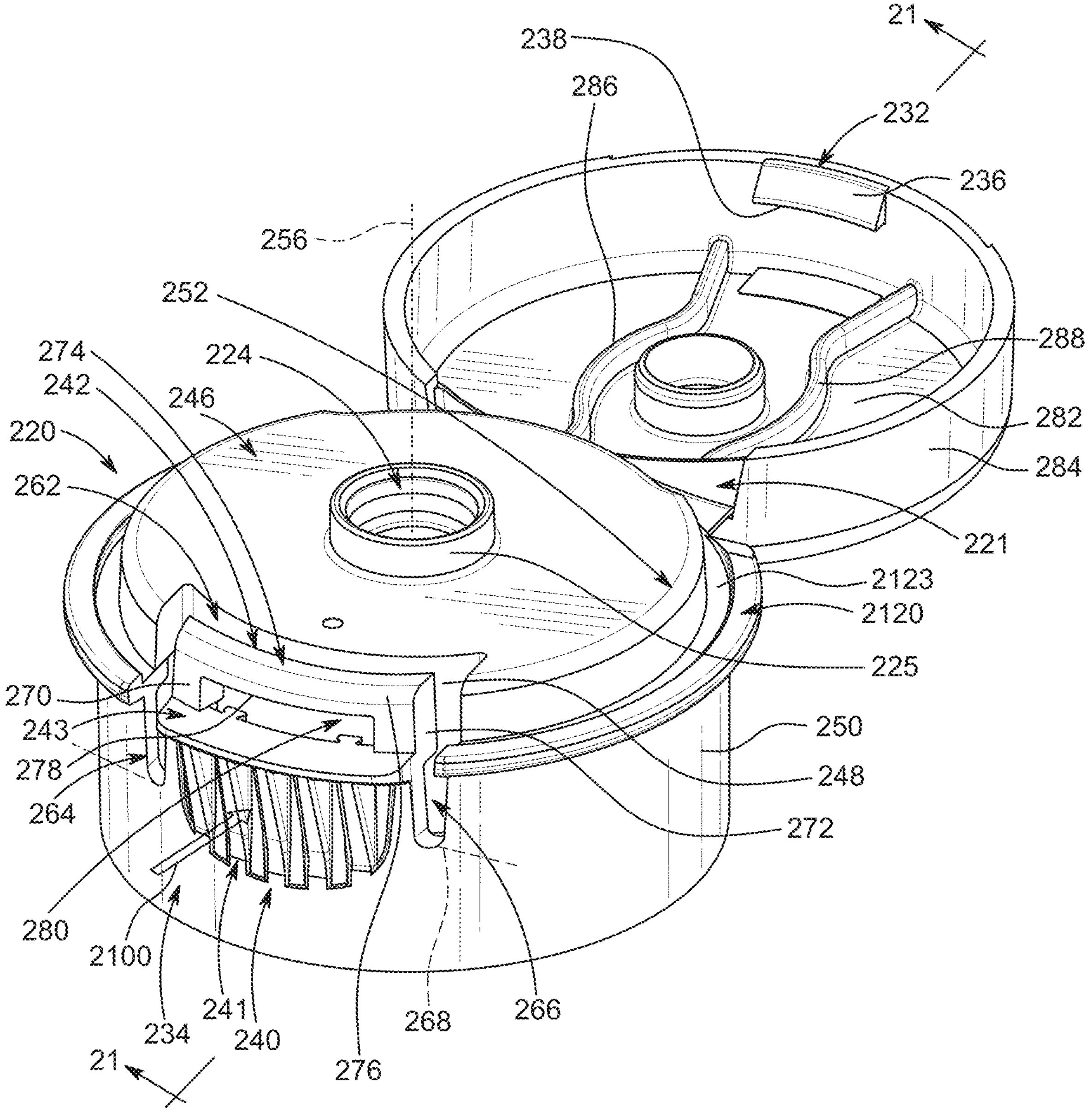
FIG. 18 is a perspective view of the dosing dispenser of FIG. 14.
Figure 19:
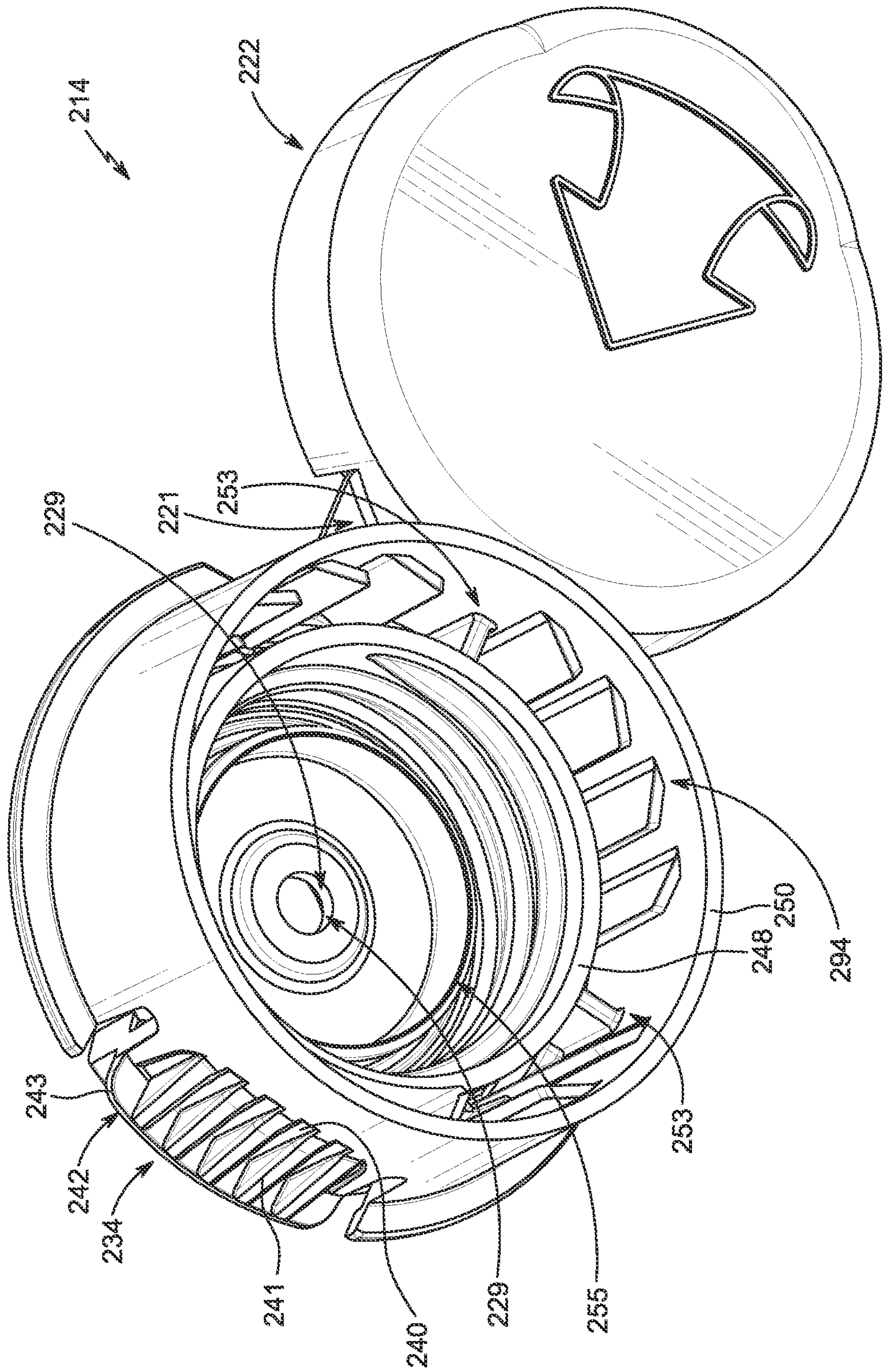
FIG. 19 is a perspective view of the dosing dispenser of FIG. 14.

Body portion 220 of dosing dispenser 214 includes a top wall 246, a first annular side wall 248, a second side wall 250, and a rim connector 252 as shown in FIGS. 17 and 18. Top wall 246 is formed to include discharge aperture 224 and central axis 256 extends generally through the center of top wall 246 and discharge aperture 224. An inside surface of first side wall 248 is threaded and engages with corresponding threads on filler neck 216 to retain dosing dispenser 214 to container 212. Second side wall 250 is coupled to first side wall 248 by rim connector 252 and a plurality of reinforcement ribs 253. Tab anchor 242 is coupled to second side wall 250.

The first side wall 248 is spaced apart from central axis 256 a first distance 258 while the second side wall 250 is spaced apart from axis 256 a second distance 260 that is greater than the first distance 258. A gap 262 is formed radially between the first side wall 248 and the second side wall 250. Rim connector 252 interconnects upper ends of the first side wall 248 and the second side wall 250 to provide the gap 262 therebetween.

The first side wall 248 extends annularly around axis 256 while only a lower portion of the second side wall 250 extends annularly around axis 256. The second side wall 250 includes a first slot 264 and a second slot 266 spaced circumferentially apart from the first slot 264 relative to the axis 256 to provide actuator pad 240 between the first slot 264 and the second slot 266 as shown in FIGS. 17 and 18. A lower end of each slot 264, 266 provides a horizontal actuator pivot axis 268. An upper end of each slot 264, 266, is unbounded by any part of body portion 220. An inward force 2100 on actuator pad 240 causes at least a portion of actuator pad 240 and tab anchor 242 to pivot and/or flex about actuator pivot axis 268 to separate tab anchor 242 from motion-blocking surface 238 of lock tab 232 so that flip-top cap 222 is free to pivot about axis 230 from a closed arrangement to an opened arrangement as shown in FIGS. 16 and 18.

Tab anchor 242 includes a pair of circumferentially spaced support posts 270, 272 and an anchor beam 274 extending between and interconnecting each support post 270, 272. Each support post 270, 272 is coupled to an upper end of actuator pad 240 for movement therewith in response to the inward force 2100. Anchor beam 274 is spaced vertically from an upper end of actuator pad 240 to provide a tab-receiving space 280 therebetween that receives lock tab 232 when flip-top cap 222 is in the closed arrangement as shown in FIG. 20.

Anchor beam 274 includes a sloped upper surface 276 and a motion-blocking surface 278. Sloped ramp surface 236 of lock tab 232 engages and rides along sloped upper surface 276 of anchor beam 274 as flip top cap 222 is moved to the closed arrangement. At least one of flip-top cap 222 and tab anchor 242 flex as the sloped ramps 236, 276 engage and move past one another as flip-top cap 222 is fully closed. Tab anchor 234 and flip-top cap 222 may at least partially unflex upon arrival in the closed arrangement so that lock tab 232 extends into tab-receiving space 280 and motion-blocking surfaces 238, 278 face toward one another to block flip-top cap 222 from rotating about pivot axis 230.

Figure 25:
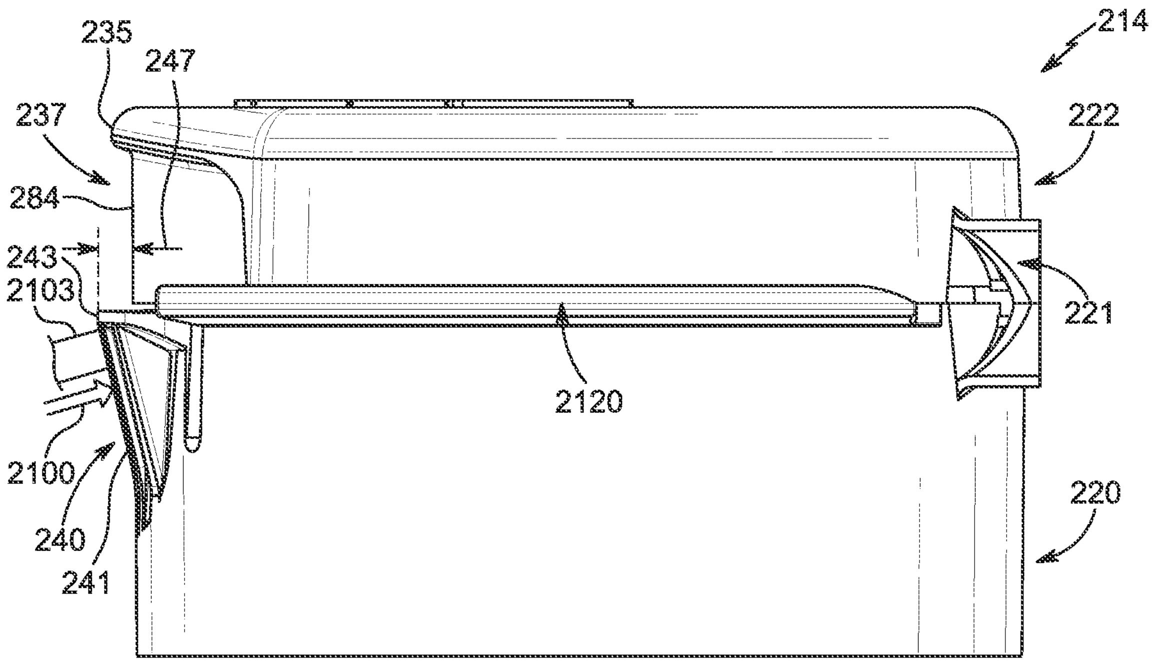
FIG. 25 is a side view of the dosing dispenser of FIG. 14 showing a child's tooth engaging an actuator pad coupled to the dosing dispenser.
Figure 26:
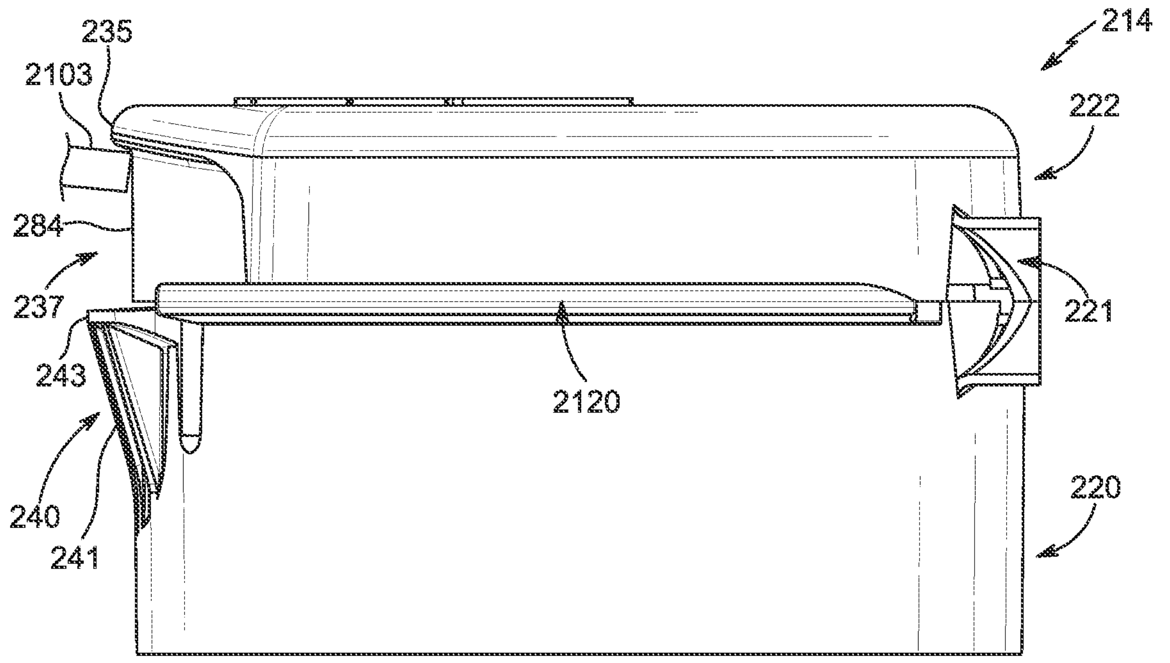
FIG. 26 is a side view of the dosing dispenser of FIG. 14 showing the child's tooth engaging a cap-opening lip coupled to the dosing dispenser.
Figure 27:
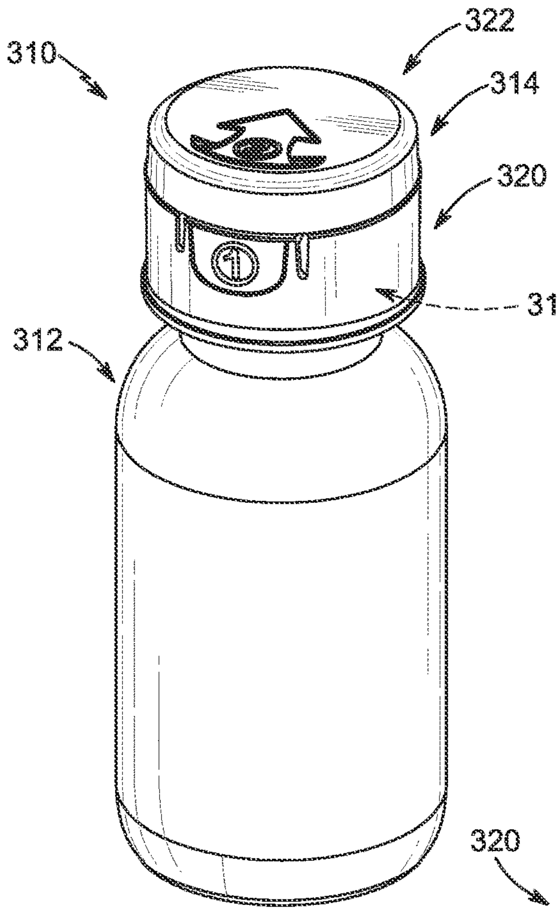
FIG. 27 is a perspective view of a package, in accordance with another embodiment of the present disclosure, including a dosing dispenser coupled to a child-resistant lock.

Child-resistant lock 218 may further include a cap-opening lip 235 coupled to flip-top cap 222 as shown in FIGS. 20, 25, and 26. Cap-opening lip 235 is coupled to an outer surface of a side wall 284 of flip-top cap 222 and is spaced apart axially from the upper end of actuator pad 240 relative to central axis 256 of body portion 220, as shown in FIG. 20, when dosing dispenser 214 is in the closed arrangement. A finger-receiving space 237 is defined vertically between the upper end of actuator pad 240 and cap-opening lip 235. Thus, side wall 284 of flip top cap 222 is located radially inward of radially-outer portions of both cap-opening lip 235 and actuator pad 240. In some embodiments, an upper end of cap-opening lip 235 is axially aligned with an upper end of top wall 282 of flip-top cap 222.

To change flip-top cap 222 from the closed arrangement to the opened arrangement, an inward force 2100 is first applied to actuator pad 240. Subsequently, a user's finger may enter finger-receiving space 237 and engage lower surfaces of cap-opening lip 235. While actuator pad 240 is deformed, an upward lifting force can be applied to cap-opening lip 235 to change flip-top cap 222 from the closed arrangement to the opened arrangement.

Spacing between the upper end of actuator pad 240 and cap-opening lip 235 blocks a child, by way of example, from biting down onto actuator pad 240 to disengage the tab anchor 242 from lock tab 232 while also applying the upward lifting force 2102 to cap-opening lip 235 as suggested in FIGS. 25 and 26. It was found that children may use their teeth 2103 to depress actuator pads in packages and immediately apply leverage with their teeth to a bottom edge of a flip-top cap to open the package. In the illustrated embodiment, if a child uses its teeth 2103 to apply an inward force 2100 to actuator pad 240 and disengage lock tab 232 from tab anchor 242, the child stops applying the inward force 2100 to actuator pad 240 by the time its teeth pull up on cap-opening lip 235. Once the inward force 2100 is not applied to actuator pad 240, tab anchor 242 reengages lock tab 232 to lock dosing dispenser 214 in the closed arrangement before any upward force is applied to flip-top cap 222. Thus, the spacing between the upper end of actuator pad 240 and cap-opening lip 235 provides a region where the child's teeth 2103 slip off actuator pad 240 before engaging cap-opening lip 235 so that tab anchor 242 has sufficient time to unflex and reengage lock tab 232. In this way, actuator pad 240 and cap-opening lip 235 of child restraint lock 218 provides two-handed opening means which the child may be unaware of to block the child from opening flip-top cap 222.

Actuator pad 240 includes a plurality of vertically-extending ribs 241 and a radially-extending flange 243 as shown in FIG. 18. Ribs 241 and radially-extending flange 243 are coupled to an outer surface of actuator pad 240. An upper end of radially-extending flange 243 is axially aligned with the upper end of actuator pad 240 relative to central axis 256. An outer surface of radially-extending flange 243 is radially outward of side wall 284 of flip-top cap 222 and second side wall 250 of body portion 220. The outer surface of radially-extending flange 243 is also radially aligned with upper ends of ribs 241. Ribs 241 have a downwardly-sloped outer surface such that lower ends of ribs 241 are radially aligned with the actuator pad 240 relative to central axis 256. Ribs 241 make it challenging for a child to apply the inward force 2100 to disengage lock tab 232 from tab anchor 242 and access an underside of the flip-top cap 222. Ribs 241 in cooperation with the positioning of the cap-opening lip 235 provide additional barriers for children attempting to enter package 210.

Radially-extending flange 243 has an upper surface 245 that interfaces with a lower end of side wall 284 of flip-top cap 222 in the closed arrangement as shown in FIG. 20. Radially-extending flange 243 extends radially outward further from central axis 256 than side wall 284. Upper surface 245 of radially-extending flange 243 extend radially outward away from side wall 284 a distance 247 that may be greater than or equal to a travel distance of tab retainer 234. Thus, even when tab retainer 234 is fully deformed, a portion of radially-extending flange 243 protrudes outwardly past side wall 284 of flip-top cap to block a child's tooth 2103 from engaging a lower end of side wall 284 and prying flip-top cap 222 open.

Figure 24:
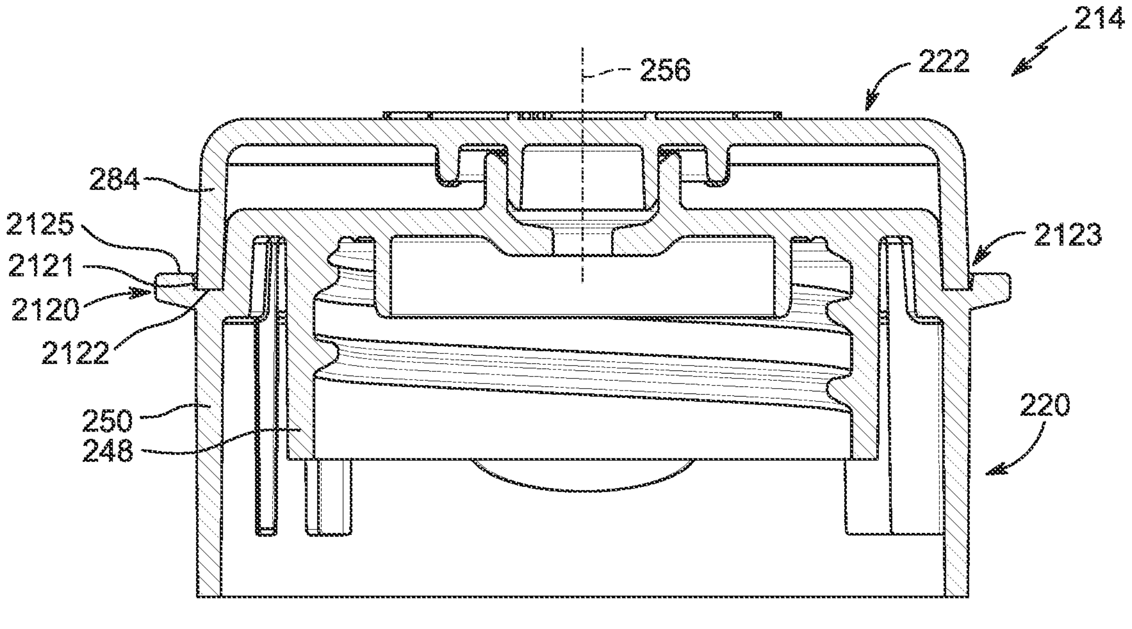
FIG. 24 is a sectional view of the dosing dispenser of FIG. 14.

Child resistant lock 218 may further include a radially-extending lip 2120 positioned at an interface between a lower end of flip-top cap 222 and body portion 220 as shown in FIGS. 20 and 24. Radially-extending lip 2120 extends along all or a portion of the second side wall 250. Radially-extending lip 2120 extends radially outward from second side wall 250 of body portion 220 to provide an axially-extending wall 2121. Axially-extending wall 2121 is radially-outward of second side wall 250 relative to the central axis 256 to define a channel 2123 which receives a lower end of side wall 284 of flip-top cap 222 in the closed arrangement. An upper end 2125 of axially-extending wall 2121 is positioned above a parting-line 2122 defined between flip-top cap 222 and body portion 220 to block objects, such as a fingernail or tooth of a child, from extending into the parting-line 2122 to pry flip-top cap 222 open without pressing actuator pad 240. It was found that children may identify parting-lines in packages and wedge their fingernails or teeth into the parting-lines to open the package. Radially-extending lip 2120 provides a faux crack location at an upper end of the radially-extending lip 2120 spaced apart vertically from parting line 2122 to pick and pry at. Children may become distracted from chasing this false positive and fail to enter the package 210.

Radially-extending lip 2120 is also configured to block unintentional depression of the tab retainer 234 or the second side wall 50 during assembly of the package 210. The outer surface of radially-extending flange 243 is spaced a first radial distance 2R1 from the central axis 256. An outer surface of axially-extending wall 2121 is spaced a second radial distance 2R2 from central axis 256. The second radial distance 2R2 is greater than or equal to the first radial distance 2R1 such that all or a substantial portion of tab retainer 234 is radially inward of the outer surface of radially-extending lip 2120. Therefore, capping equipment, for example, can grip onto radially-extending lip 2120 during assembly of the package 210 without depressing the tab retainer 234 and opening flip-top cap 222 or damaging dosing dispenser 214. An opened flip-top cap 222 could interfere with other equipment during the assembly process.

Flip-top cap 222 further includes a top wall 282, a side wall 284, and a pair of reinforcement ribs 286, 288 coupled to a lower surface of top wall 282 facing toward body portion 220 in the closed arrangement. Top wall 282 completely covers top wall 246 of body portion 220 in the closed arrangement. Side wall 284 has an inside diameter that corresponds with an outer diameter of a portion of body portion 220 to receive the portion of body portion 220 in the closed arrangement. Reinforcement ribs 286, 288 extend from a forward end of flip-top cap 222 to a rear end of flip-top cap 222 to reduce flexing of top wall 282 when flip-top cap 222 is being closed so that plug 223 can be inserted into discharge aperture 224 and provide a seal while reducing a thickness of top wall 282. Reinforcement ribs 286, 288 are curved to extend around and accommodate an outer diameter of discharge nozzle 225.

Some comparable packages (not shown) may require a liner, such as a removable seal, to initially block access to a product held by container and removal of the product from the container until the liner is removed or broken. Illustratively, plug 223 and child-resistant lock 218 allows package to be linerless or free of a liner made of a film, foil, combinations thereof, or any suitable alternative. Plug 223 provides a reusable seal to block access to product in container 212 when flip-top cap 222 is closed. Dosing dispenser 214 further includes a container plug seal 255 that extends into filler neck 216 and a rim seal 257 that engages an upper end of filler neck 216.

Figure 22:
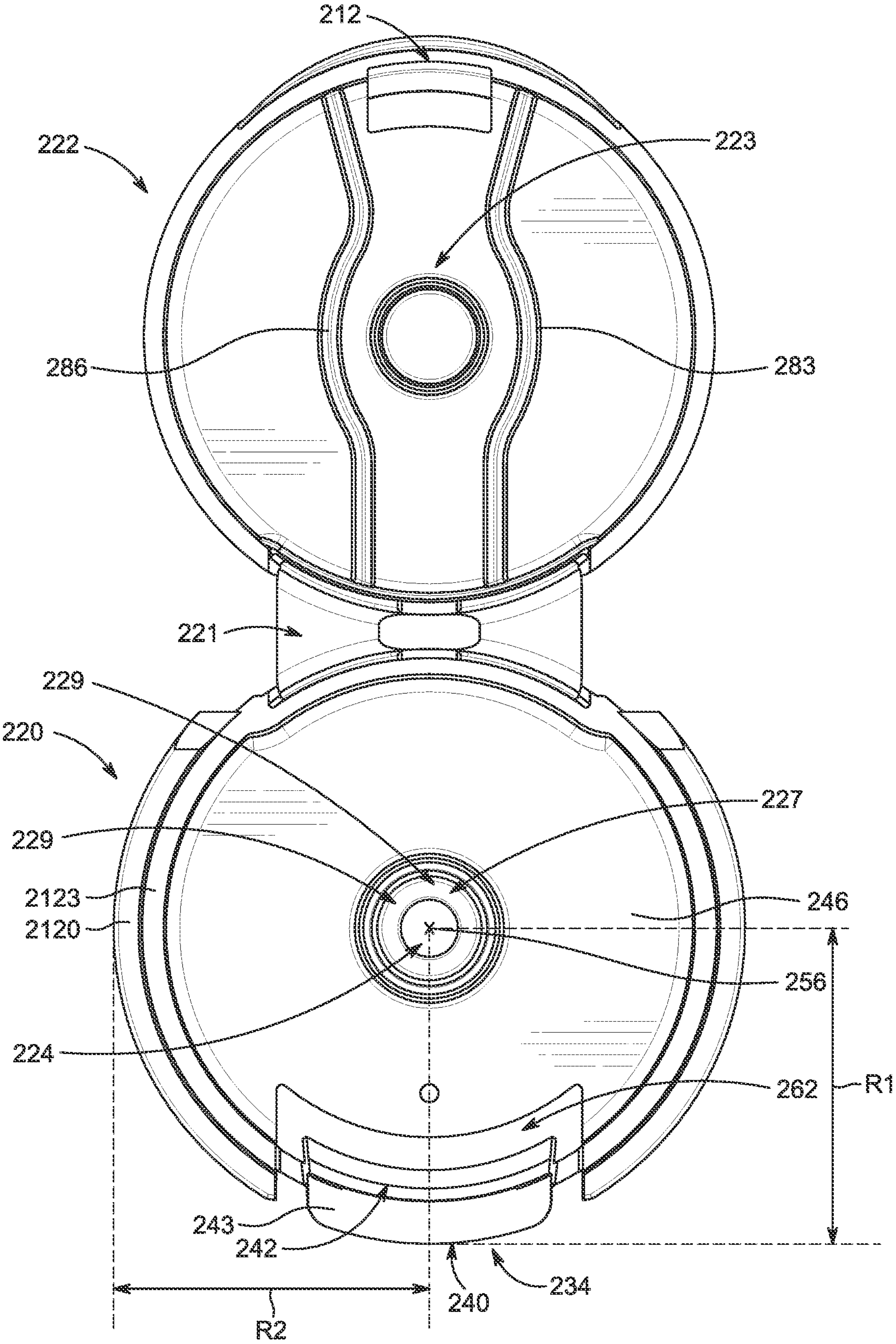
FIG. 22 is a top plane view of the dosing dispenser of FIG. 14 showing the flip-top cap in the opened arrangement.
Figure 23:
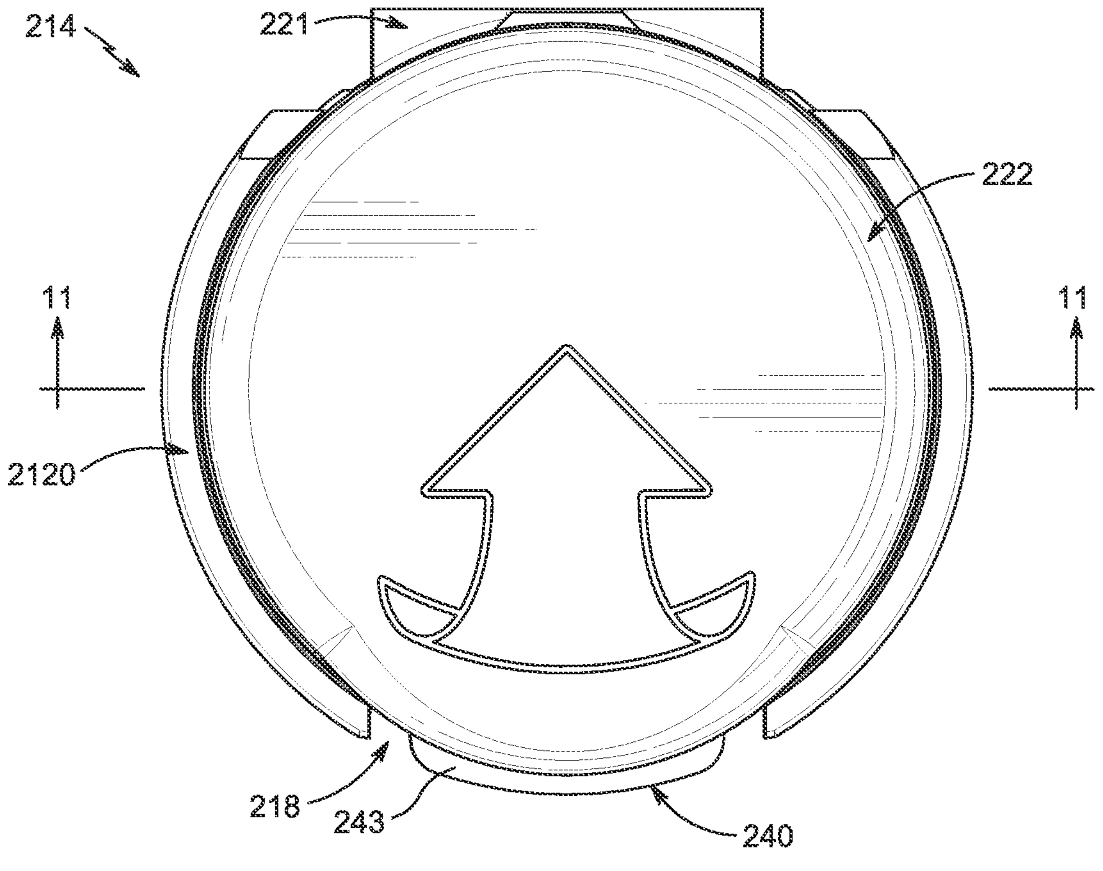
FIG. 23 is a top plane view of the dosing dispenser of FIG. 14 showing the flip-top cap in the closed arrangement.

In one embodiment, discharge nozzle 225 is sized and shaped to be used without a syringe to withdraw product from container 212, as shown in FIG. 22. Discharge nozzle 225 includes a nozzle side wall 227 and an inlet ring 229 coupled to an inside surface of nozzle side wall 227. Inlet ring 229 is spaced below an upper opening to discharge nozzle 225 and has a smaller inner diameter than the discharge nozzle 225 to block insertion of a syringe. Instead, dosing dispenser 214 may be used with container 212 to release liquid product upon application of a squeezing force on container to force liquid product out of the discharge aperture 224. A package 310 in accordance with another embodiment of the present disclosure includes a container 312, a dosing dispenser 314 coupled to a filler neck 316 of container 312, and a child-resistant lock 318, as shown, for example, in FIG. 27. Dosing dispenser 314 includes body portion 320 adapted to be mounted on container 312 and includes a flip-top cap 322 that is pivotably coupled to body portion 320 to conceal a discharge aperture 324. Discharge aperture 324 is configured to accept a fluid-transfer tip of a syringe that is used to withdraw liquid from container 312.

Figure 33:
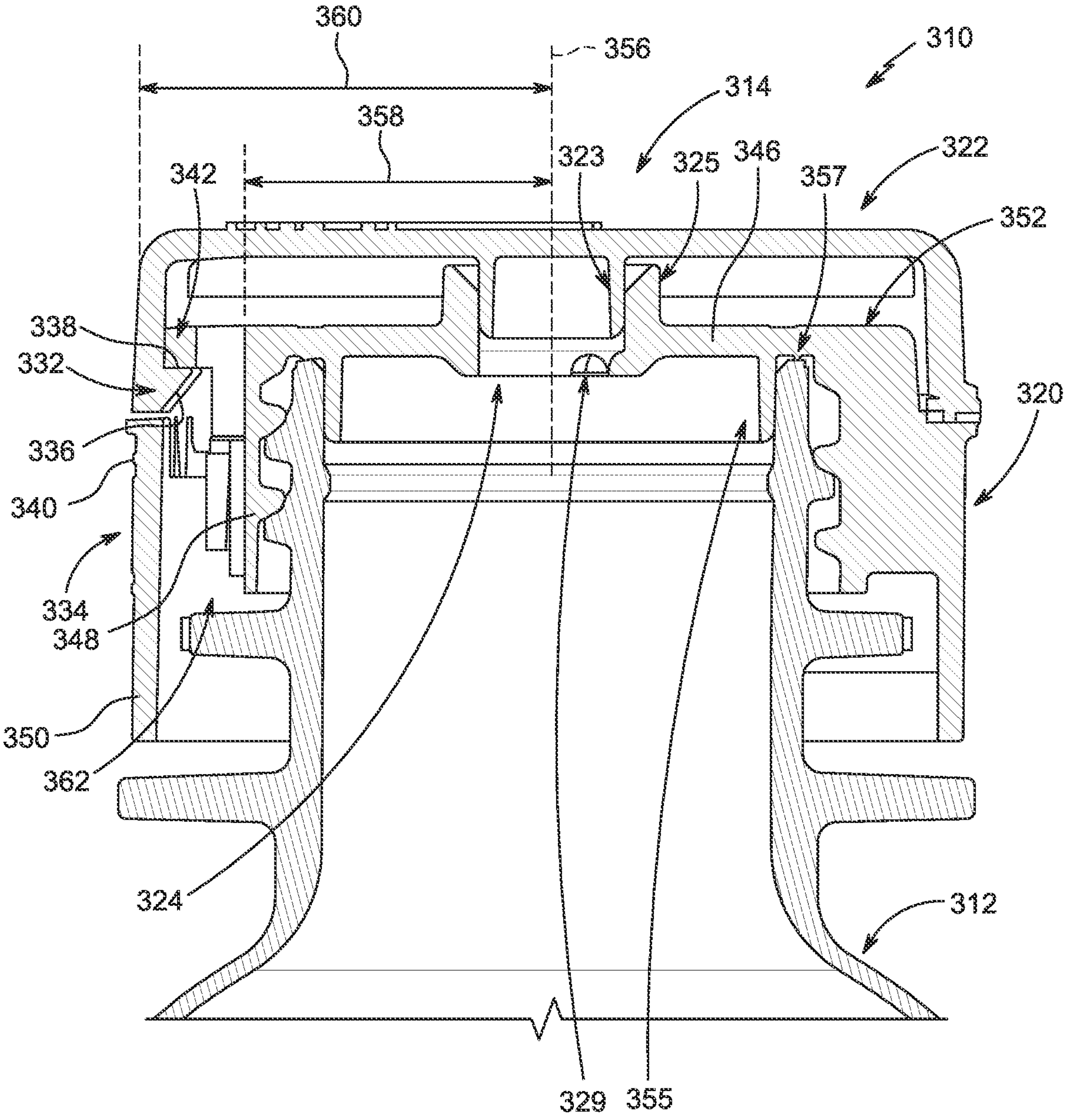
FIG. 33 is a sectional view of the package of FIG. 27 in a closed arrangement.
Figure 34:
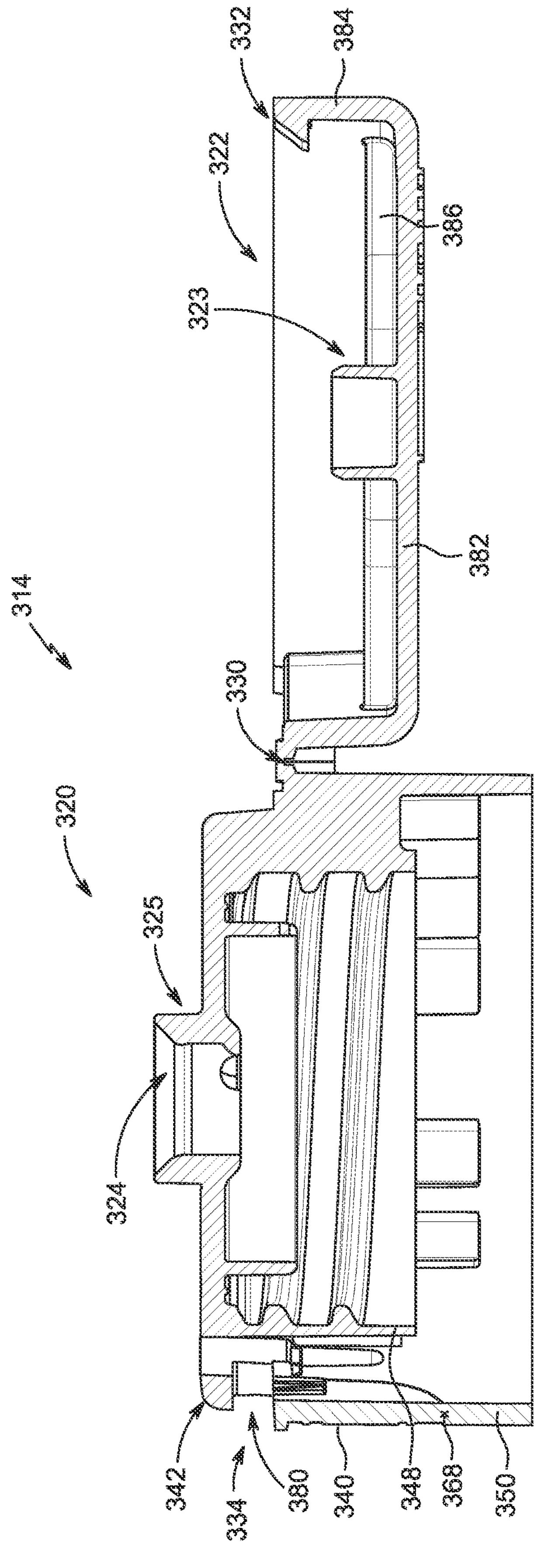
FIG. 34 is a sectional view of the package of FIG. 27 in an opened arrangement.

Dosing dispenser 314 is configured to change from an opened arrangement, where flip-top cap 322 is pivoted about a flip-top pivot axis 330 away from body portion 320, and a closed arrangement, where flip-top cap 322 is pivoted about the flip-top pivot axis 330 into engagement with body portion 320 to block access to discharge aperture 324. Child-resistant lock 318 is configured to retain the flip-top cap 322 in the closed arrangement to provide means for blocking unauthorized use and withdrawal of liquid from container 312 of the package 310 while the flip-top cap 322 is in the closed arrangement. The flip-top cap 322 may include a plug 323 that is inserted into the discharge aperture 324 in the closed arrangement to seal against surfaces defining the discharge aperture 324 as shown in FIG. 33. Illustratively, discharge aperture 424 is at least partially defined by a discharge nozzle 325 that extends upwardly toward flip-top cap 322 and that receives the plug 323 in the closed arrangement.

Figure 29:
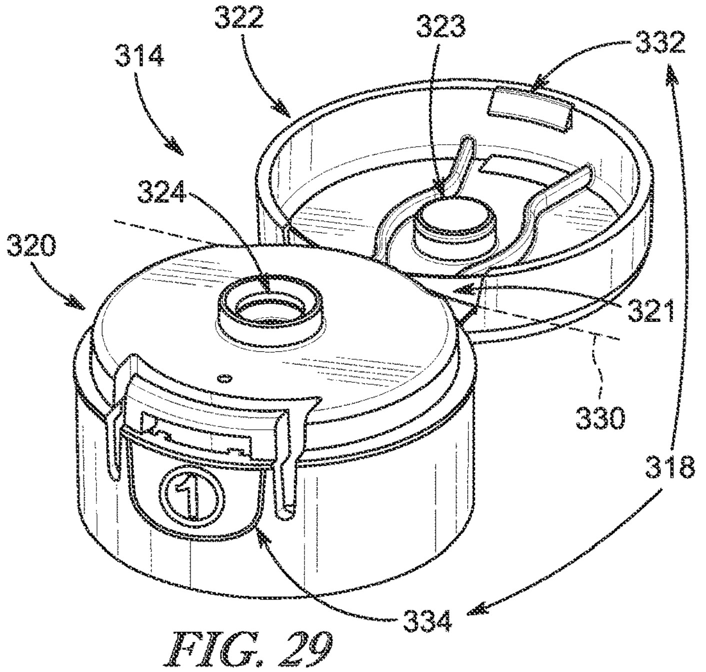
FIG. 29 is a perspective view of the dosing dispenser of FIG. 27 showing the flip-top cap in an opened arrangement.
Figure 28:
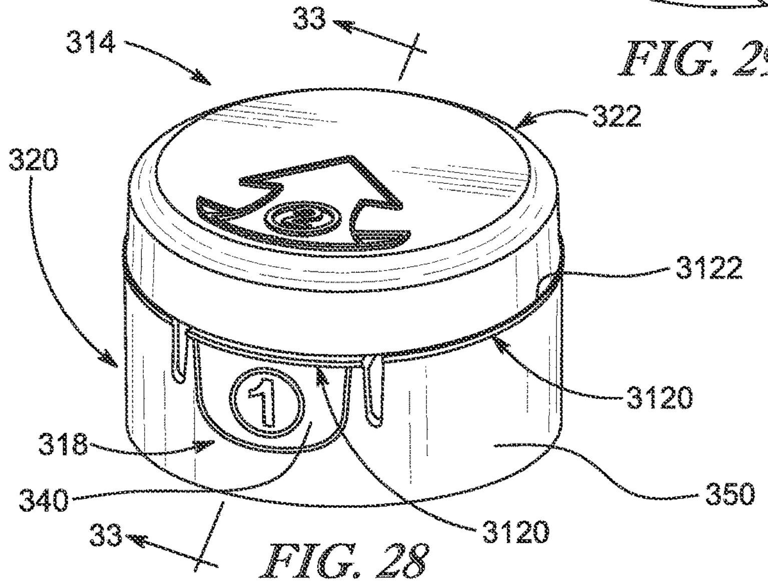
FIG. 28 is a perspective view of the dosing dispenser of FIG. 27 including a flip-top cap in a closed arrangement.

Child resistant lock 318 includes a lock tab 332 coupled to the flip-top cap 322, as shown in FIG. 28, and a tab retainer 334 coupled to the body portion 320 as shown in FIG. 29. The lock tab 332 includes a sloped ramp surface 336 and a motion-blocking surface 338. The tab retainer 334 includes an actuator pad 340 and a tab anchor 342 coupled to an upper end of the actuator pad 340. Motion-blocking surface 338 of lock tab 332 is configured to engage a lower surface of tab anchor 342 to restrict movement of the dosing dispenser 314 from the closed arrangement to the opened arrangement as shown in FIG. 33.

Figure 30:
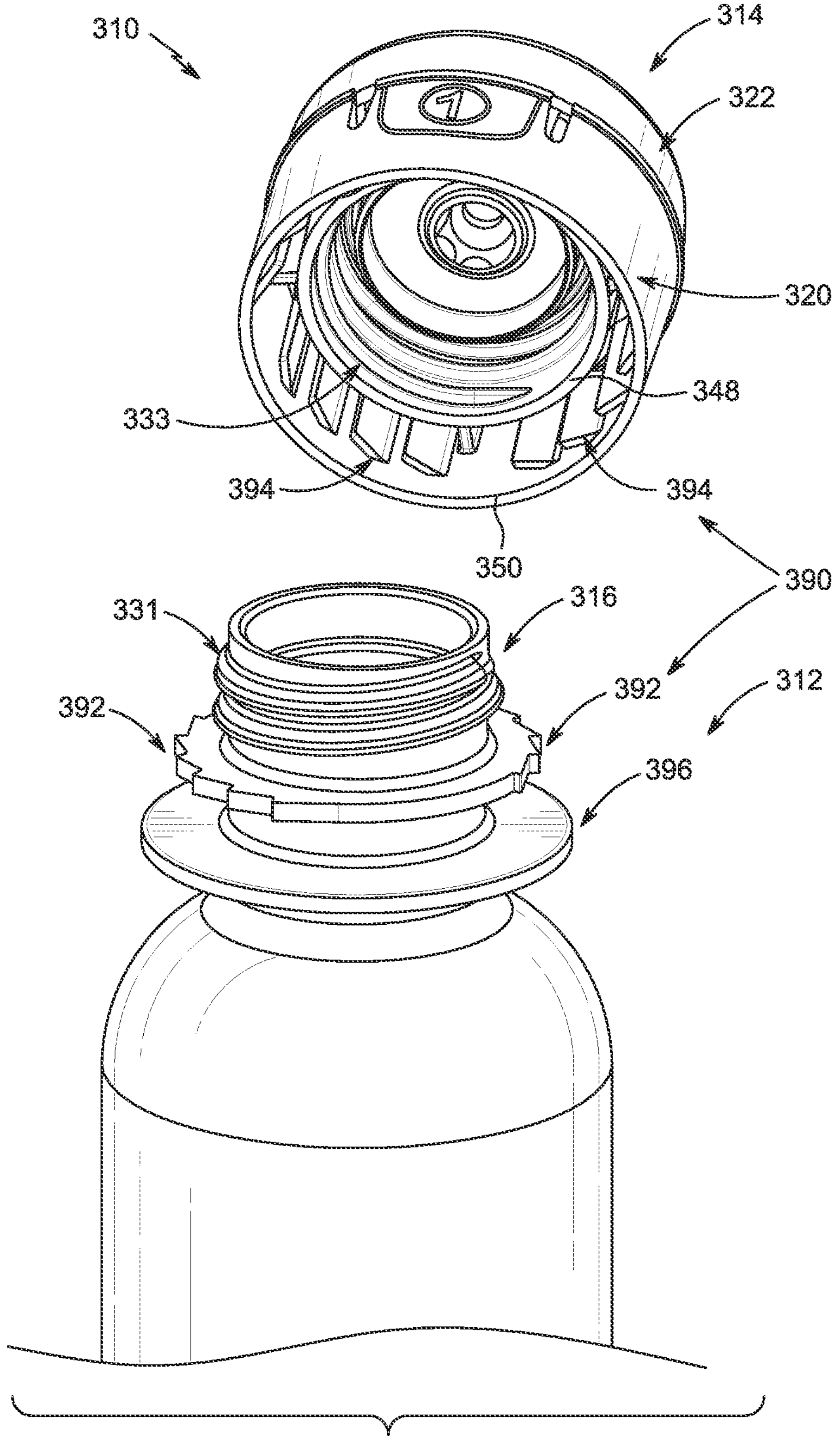
FIG. 30 is a perspective view of the package of FIG. 27 with the dosing dispenser removed from a container of the package.

Dosing dispenser 314 may initially be screwed onto filler neck 316 using threads 331, 333 as shown in FIG. 30. The package 310 further includes a closure retention system 390 configured to retain the dosing dispenser 314 to the container 312 after full installation on the container 312 to block unintentional removal of the dosing dispenser 314 from the container 312 by a child, for example. The closure retention system 390 includes a plurality of ratchet teeth 392 coupled to the container 312 and a plurality of ratchet fins 394 coupled to the dosing dispenser 314 as shown in FIG. 30. The plurality of ratchet teeth 392 are spaced below threads 331 on filler neck 316 and are shaped to allow rotation of the dosing dispenser 314 in a clockwise, installation direction. The plurality of ratchet teeth 392 and the plurality of ratchet fins 394 cooperate with one another to block rotation of the dosing dispenser 314 in a counterclockwise, removal direction opposite the clockwise, installation direction. Container 312 further includes a shroud ring 396 located below the plurality of ratchet teeth 392. Shroud ring 396 is positioned directly below a bottom edge of body portion 320 to block access to the plurality of ratchet fins 394 when the dosing dispenser 314 is fully installed on container 312.

Figure 31:
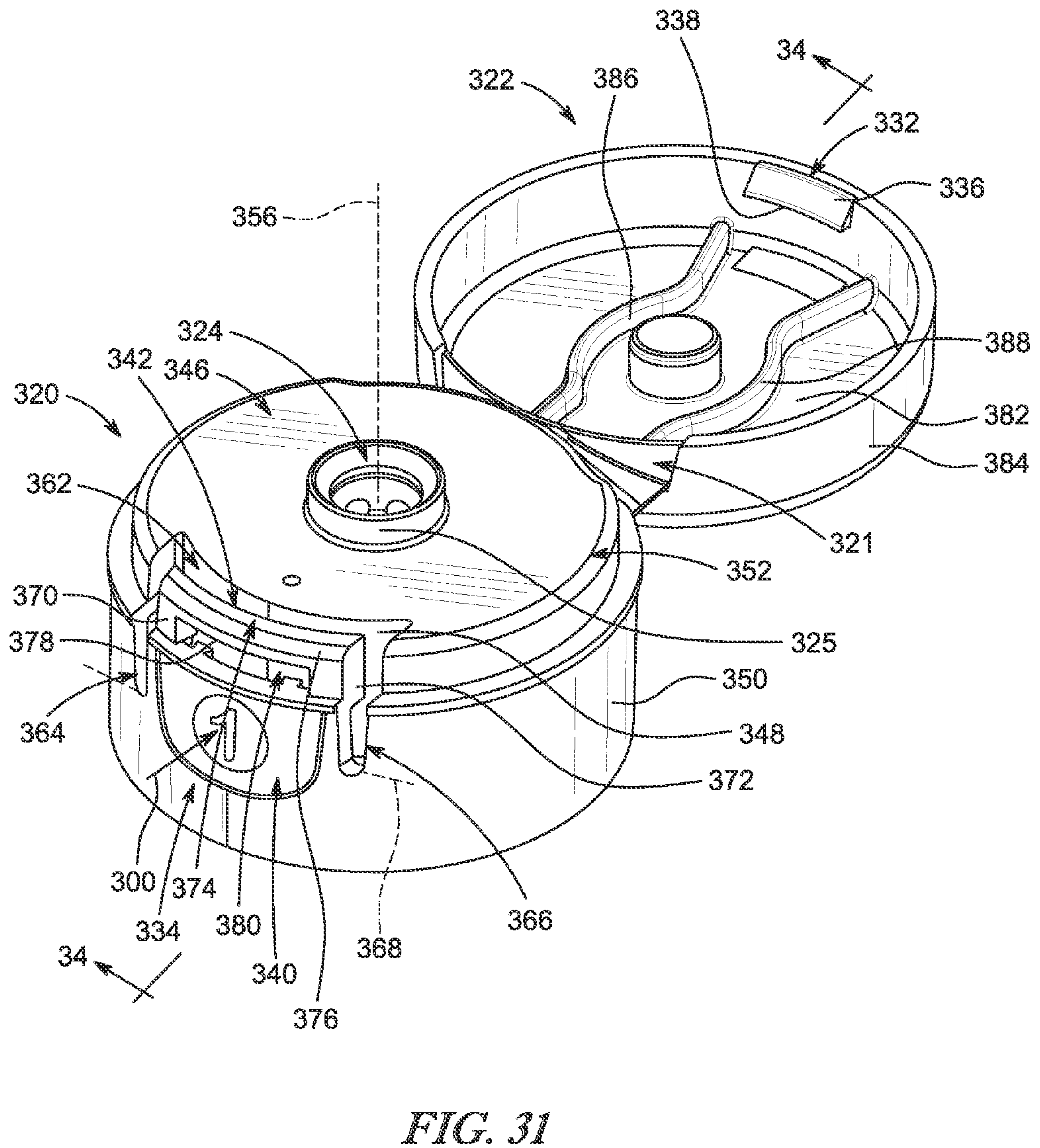
FIG. 31 is a perspective view of the dosing dispenser of FIG. 27.
Figure 32:
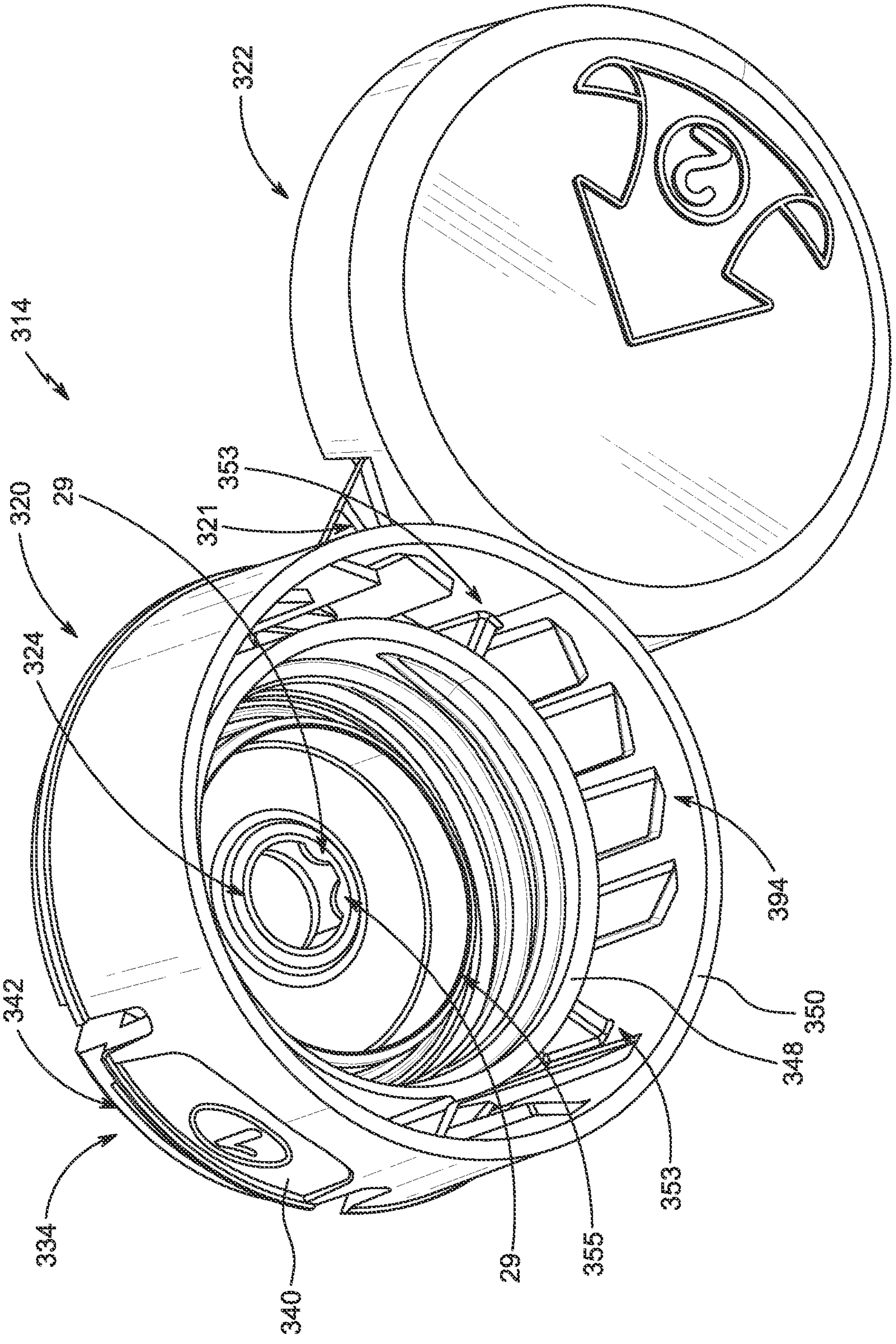
FIG. 32 is a perspective view of the dosing dispenser of FIG. 27.

Body portion 320 of dosing dispenser 314 includes a top wall 346, a first annular side wall 348, a second side wall 350, and a rim connector 352 as shown in FIGS. 30 and 31. The top wall 346 is formed to include discharge aperture 324 and has a central axis 356 that extends generally through the center of the top wall 346 and discharge aperture 324. An inside surface of first side wall 348 is threaded and engages with corresponding threads on filler neck 316 to retain dosing dispenser 314 to container 312. Second side wall 350 is coupled to first side wall 348 by rim connector 352 and a plurality of reinforcement ribs 353. Tab anchor 342 is coupled to second side wall 350.

The first side wall 348 is spaced apart from the central axis 356 a first distance 358 while the second side wall 350 is spaced apart from the axis 356 a second distance 360 that is greater than the first distance 358. A gap 362 is formed radially between the first side wall 348 and the second side wall 350. The rim connector 352 interconnects upper ends of the first side wall 348 and the second side wall 350 to provide the gap 362 therebetween.

The first side wall 348 extends annularly around the axis 356 while only a lower portion of the second side wall 350 extends annularly around the axis 356. The second side wall 350 includes a first slot 364 and a second slot 366 spaced circumferentially apart from the first slot 364 relative to the axis 356 to provide the actuator pad 340 between the first slot 364 and the second slot 366 as shown in FIGS. 30 and 31. A lower end of each slot 364, 366 provides a horizontal actuator pivot axis 368. An upper end of each slot 364, 366, is unbounded by any part of body portion 320. An inward force 3100 on actuator pad 340 causes at least a portion of actuator pad 340 and tab anchor 342 to pivot and/or flex about actuator pivot axis 368 to separate tab anchor 342 from motion-blocking surface 338 of lock tab 332 so that the flip-top cap 322 is free to pivot about axis 330 from a closed arrangement to an opened arrangement as shown in FIGS. 29 and 31.

Tab anchor 342 includes a pair of circumferentially spaced support posts 370, 372 and an anchor beam 374 extending between and interconnecting each support post 370, 372. Each support post 370, 372 is coupled to an upper end of the actuator pad 342 for movement therewith in response to the inward force 3100. Anchor beam 374 is spaced vertically from an upper end of actuator pad 340 to provide a tab-receiving space 380 therebetween that receives the lock tab 332 when the flip-top cap 322 is in the closed arrangement as shown in FIG. 33.

Anchor beam 374 includes a sloped upper surface 376 and a motion-blocking surface 378. Sloped ramp surface 336 of lock tab 332 engages and rides along sloped upper surface 376 of anchor beam 374 as flip top cap 322 is moved to the closed arrangement. At least one of the flip-top cap 322 and the tab anchor 342 flex as the sloped ramps 336, 376 engage and move past one another as the flip-top cap 322 is fully closed. The tab anchor 334 and the flip-top cap 322 may at least partially unflex upon arrival in the closed arrangement so that the lock tab 332 extends into tab-receiving space 380 and motion-blocking surfaces 338, 378 face toward one another to block flip-top cap 322 from rotating about pivot axis 330.

Child resistant lock 318 may further include a radially-extending lip 3120 positioned at an interface between a lower end of the flip-top cap 322 and the body portion 320 as shown in FIG. 28. The radially-extending lip 3120 extends along all or a portion of actuator pad 340 and second side wall 350. Radially-extending lip 320 is positioned directly below a parting-line 3122 defined between flip-top cap 322 and body portion 320 to block objects, such as a fingernail of a child, from extending into the parting-line 3122 to pry the flip-top cap 322 open without pressing actuator pad 340. It was found that children may identify parting-lines in packages and wedge their fingernails into the parting-lines to open the package. The radially-extending lip 3120 provides a faux crack location at a lower end of the radially-extending lip 3120 to pick and pry at. Children may become distracted from chasing this false positive and fail to enter the package 310.

Flip-top cap 322 further includes a top wall 382, a side wall 384, and a pair of reinforcement ribs 386, 388 coupled to a lower surface of top wall 382 facing toward body portion 320 in the closed arrangement. Top wall 382 completely covers top wall 346 of body portion 320 in the closed arrangement. Side wall 384 has an inside diameter that corresponds with an outer diameter of a portion of body portion 320 to receive the portion of body portion 320 in the closed arrangement. Reinforcement ribs 386, 388 extend from a forward end of flip-top cap 322 to a rear end of flip-top cap 322 to reduce flexing of top wall 382 when flip-top cap 322 is being closed so that plug 323 can be inserted into discharge aperture 324 and provide a seal while reducing a thickness of top wall 382. Reinforcement ribs 386, 388 are curved to extend around and accommodate an outer diameter of discharge nozzle 325.

Some comparable packages (not shown) may require a liner, such as a removable seal, to initially block access to a product held by container and removal of the product from the container until the liner is removed or broken. Illustratively, plug 323 and child-resistant lock 318 allows package to be linerless or free of a liner made of a film, foil, combinations thereof, or any suitable alternative. Plug 323 provides a reusable seal to block access to product in container 312 when flip-top cap 322 is closed. Dosing dispenser 314 further includes a container plug seal 355 that extends into filler neck 316 and a rim seal 357 that engages an upper end of filler neck 316.

Figure 35:
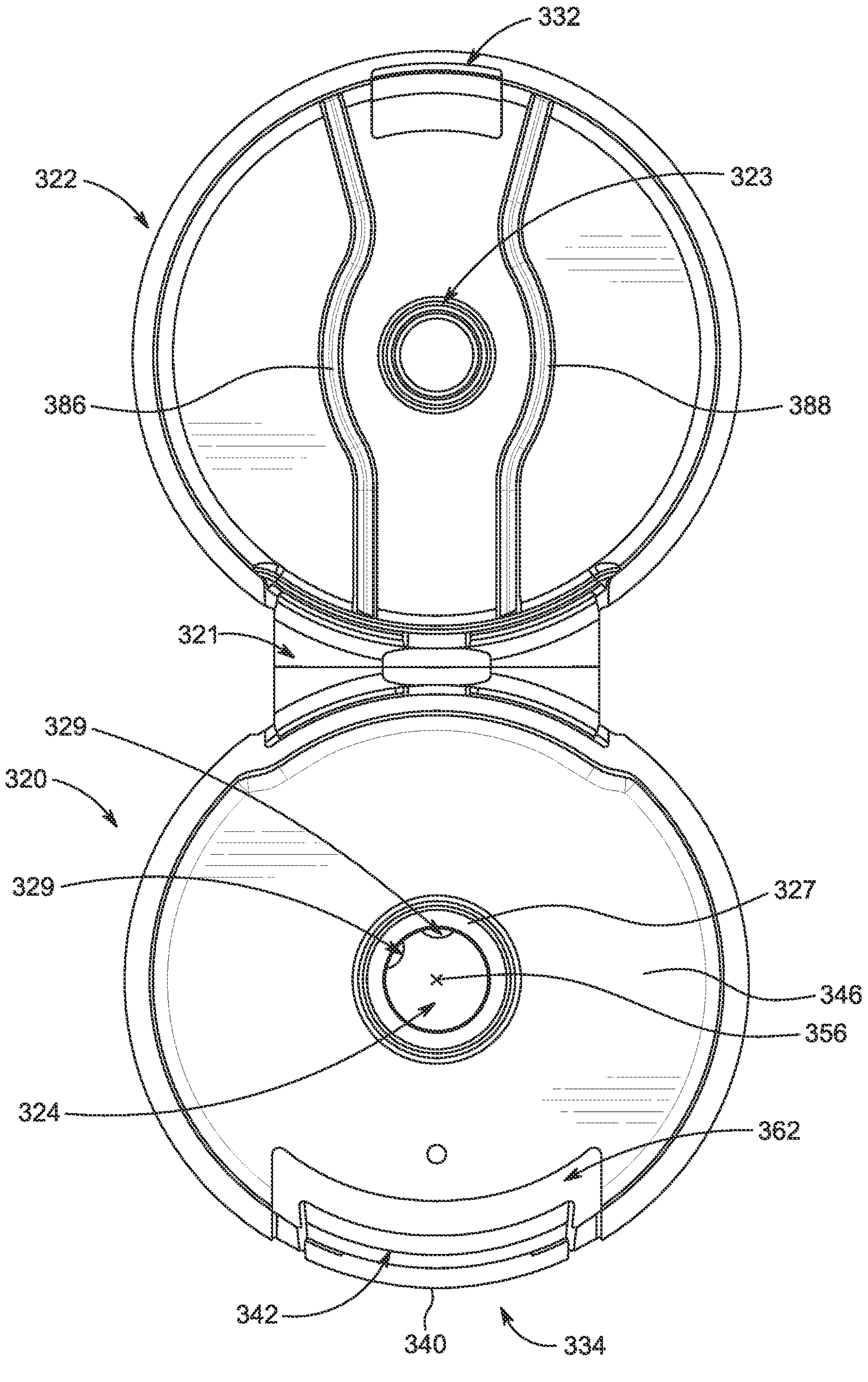
FIG. 35 is a top plane view of the dosing dispenser of FIG. 27.

In one embodiment, discharge nozzle 325 is sized to receive a syringe to withdraw liquid product from the container 312. Discharge nozzle 325 includes an annular side wall 327 that defines discharge aperture 324 and vent means 329. Vent means 329 blocks a complete seal from forming between the syringe and the discharge nozzle 325 to allow for evacuation of the liquid product without deforming container 312. Vent means 329 in the illustrative embodiment includes a pair of spacers 329 coupled to nozzle side wall 327 and extending radially inward toward axis 356. The spacers 329 are rounded protrusions in the illustrative embodiment but may take another shape or form in other embodiments. The spacers 329 are oriented less than 180 degrees from one another about axis 356. The spacers 329 may be oriented less than 90 degrees from one another about axis 356 as shown in FIG. 35.

Figure 36:
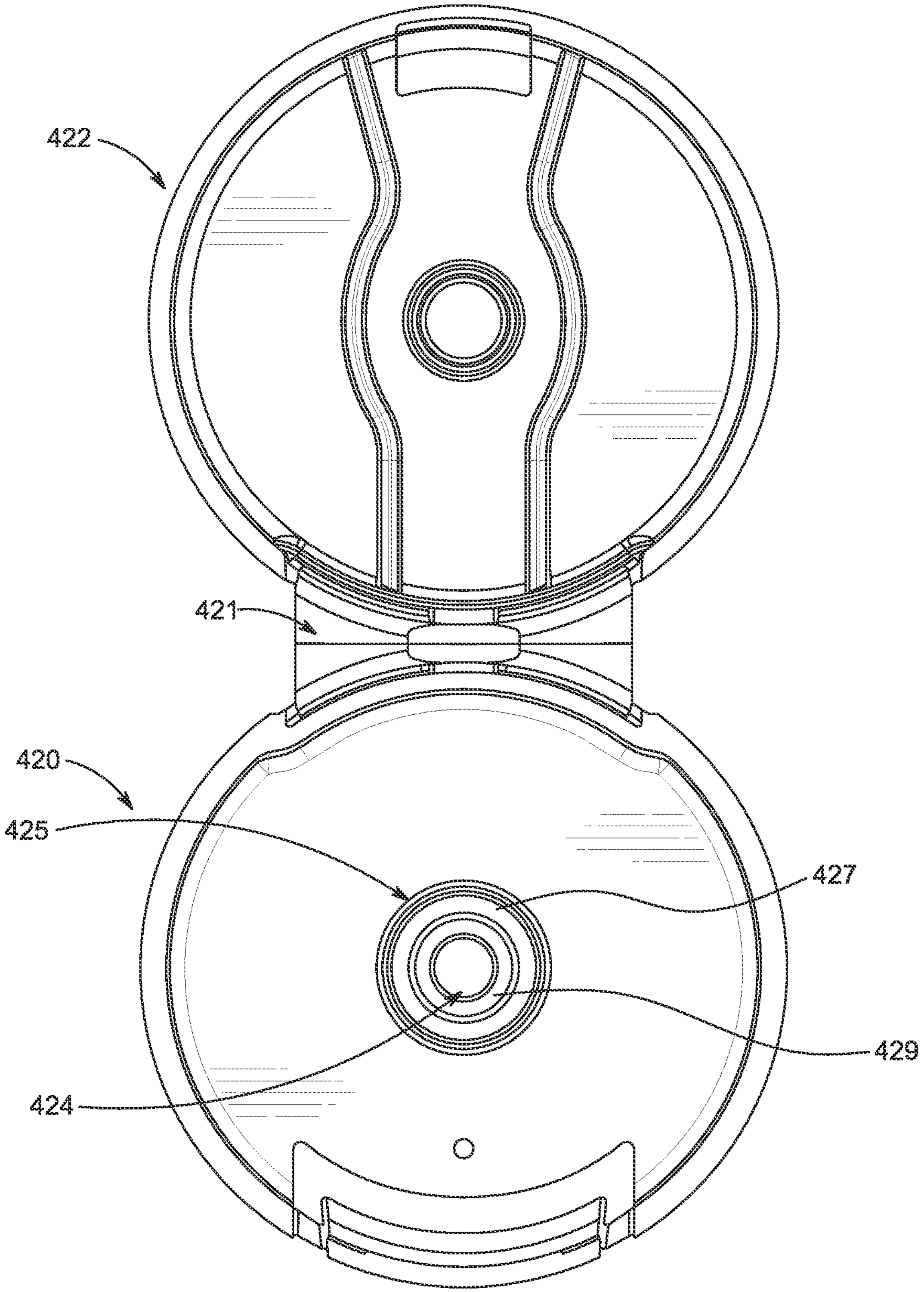
FIG. 36 is a top plane view of another embodiment of a dosing dispenser.

Another embodiment of a dosing dispenser 414 is shown in FIG. 36. Dosing dispenser 414 is substantially similar to dosing dispenser 314. Accordingly, the disclosure of dosing dispenser 314 is incorporated by reference for dosing dispenser 414 except for the differences explicitly described below.

Dosing dispenser 414 includes a body portion 420 defining a discharge aperture 424. Discharge aperture 424 is defined by a discharge nozzle 425 that is sized and shaped to be used without a syringe to withdraw product from container 412. Discharge nozzle 425 includes a nozzle side wall 427 and an inlet ring 429 coupled to an inside surface of nozzle side wall 427. Inlet ring 429 is spaced below an upper opening to discharge nozzle 425 and has a smaller inner diameter than the discharge nozzle 425 to block insertion of a syringe. Instead, dosing dispenser 414 may be used with container 312 to release liquid product upon application of a squeezing force on container to force liquid product out of the discharge aperture 424.

The invention claimed is:

1. A dosing dispenser comprising a body portion having a central axis and including a top wall, a first side wall, a second side wall, and a rim connector extending between and interconnecting the first and second side walls, the top wall is formed to include a discharge aperture aligned with the central axis, the first side wall having a threaded inside surface adapted to engage with corresponding threads on a filler neck of a container, the second side wall is coupled to the first side wall by rim connector and is spaced further from the central axis than the first side wall, a flip-top cap coupled to the body portion for pivotable movement about a pivot axis from a closed arrangement covering the discharge aperture and an opened arrangement spaced away from the discharge aperture, and a child resistant lock including a lock tab coupled to the flip-top cap and a tab retainer coupled to the body portion to engage selectively with the lock tab when the flip-top cap is in the closed arrangement to block pivoting movement of the flip-top cap from the closed arrangement to the opened arrangement, wherein the lock tab is coupled to an inside surface of a side wall of the flip-top cap and the tab retainer includes an actuator pad coupled to the second side wall of the body portion and a tab anchor coupled to an upper surface of the actuator pad, the actuator pad defined by a pair of lateral slots formed in the second side wall to provide a horizontal pivot axis at lower, terminal ends of each slot for the tab retainer to move between a normally locked position, in which the lock tab is received within a tab receiving space defined between the tab anchor and the actuator pad when the flip-top cap is in the closed arrangement, and an unlocked position, in which the tab anchor is spaced apart from the lock tab to allow pivoting of the flip-top cap from the closed arrangement to the opened arrangement, and wherein the tab anchor includes a pair of circumferentially spaced support posts and an anchor beam extending between and interconnecting each support post, wherein each support post is coupled to the upper surface of the actuator pad, wherein the anchor beam is spaced vertically from the upper end of actuator pad to provide a tab-receiving space therebetween that receives lock tab when flip-top cap is in the closed arrangement.

2. The dosing dispenser of claim 1, wherein the child resistant lock further includes a vertically-extending lip arranged to extend along at least a portion of the second side wall and axially outward from the second side wall relative to the central axis.

3. The dosing dispenser of claim 2, wherein the vertically-extending lip further includes an upper surface that is arranged to lie above a lower end of the side wall of the flip-top cap in the closed arrangement.

4. The dosing dispenser of claim 2, wherein the vertically-extending lip cooperates with the second side wall of the body portion to define a channel and a lower end of the side wall of the flip-top cap is received in the channel when the flip-top cap is in the closed arrangement.

5. The dosing dispenser of claim 1, wherein the actuator pad includes a pad panel coupled to the second side wall and a radially-extending flange coupled to an upper end of the pad panel and extending radially outward from the pad panel away from the central axis.

6. The dosing dispenser of claim 5, wherein the child resistant lock further includes a vertically-extending lip coupled to an outer surface of the second side wall and extending axially outward away from the second side wall relative to the central axis.

7. The dosing dispenser of claim 5, wherein the radially-extending flange of the actuator pad has an upper surface that extends radially outward away from the side wall of the flip-top cap such that an outer end of the radially-extending flange is spaced further from the central axis than the side wall of the flip-top cap.

8. The dosing dispenser of claim 7, wherein the outer end of the radially-extending flange is spaced apart from the side wall of the flip-top cap a first distance and the tab retainer is configured to deflect inwardly toward the first side wall of the body portion a second distance, the first distance being greater than or equal to the second distance.

9. The dosing dispenser of claim 5, wherein the child resistant lock further includes a cap-opening lip coupled to an outer surface of the side wall of the flip-top cap, the cap-opening lip being circumferentially aligned with the tab retainer and spaced apart vertically from an upper end of the actuator pad to define a finger-receiving space vertically between the actuator pad and the cap-opening lip.

10. The dosing dispenser of claim 6, wherein the vertically-extending lip includes an upper surface that is arranged to lie above a lower end of the side wall of the flip-top cap in the closed arrangement, and wherein the vertically-extending lip cooperates with the second side wall of the body portion to define a channel and a lower end of the side wall of the flip-top cap is received in the channel when the flip-top cap is in the closed arrangement.

11. A closure for a container, the closure comprising a body portion including a top wall, a first side wall, a second side wall, and a rim connector extending between and interconnecting the first and second side walls, the top wall is formed to include a discharge aperture, a flip-top cap coupled to the body portion for pivotable movement about a pivot axis from a closed arrangement covering the discharge aperture and an opened arrangement spaced away from the discharge aperture, and a child resistant lock including a lock tab coupled to the flip-top cap and a tab retainer coupled to the body portion to engage selectively with the lock tab when the flip-top cap is in the closed arrangement to block pivoting movement of the flip-top cap from the closed arrangement to the opened arrangement, wherein the lock tab is coupled to an inside surface of a side wall of the flip-top cap and the tab retainer includes an actuator pad coupled to the second side wall of the body portion and a tab anchor coupled to an upper surface of the actuator pad, the actuator pad defined by a pair of lateral slots formed in the second side wall to provide a horizontal pivot axis at lower, terminal ends of each slot for the tab retainer to move between a normally locked position, in which the lock tab is received within a tab receiving space defined between the tab anchor and the actuator pad when the flip-top cap is in the closed arrangement, and an unlocked position, in which the tab anchor is spaced apart from the lock tab to allow pivoting of the flip-top cap from the closed arrangement to the opened arrangement, and wherein the tab anchor includes a pair of circumferentially spaced support posts and an anchor beam extending between and interconnecting each support post, wherein each support post is coupled to the upper surface of the actuator pad, wherein the anchor beam is spaced vertically from the upper end of actuator pad to provide a tab-receiving space therebetween that receives lock tab when flip-top cap is in the closed arrangement.

12. The closure of claim 11, wherein the child resistant lock further includes an outwardly-extending lip coupled to an outer surface of the second side wall, the outwardly-extending lip including a vertical wall arranged to lie outwardly outward of the side wall of the flip-top cap in the closed arrangement.

13. The closure of claim 12, wherein the outwardly-extending lip further includes an upper surface that is arranged to lie above a lower end of the side wall of the flip-top cap in the closed arrangement.

14. The closure of claim 12, wherein the outwardly-extending lip cooperates with the second side wall of the body portion to define a channel and a lower end of the side wall of the flip-top cap is received in the channel when the flip-top cap is in the closed arrangement.

15. The closure of claim 11, wherein the actuator pad includes a pad panel coupled to the second side wall and an outwardly-extending flange coupled to an upper end of the pad panel and extending outwardly outward from the pad panel away from the pad panel and the second side wall of the body portion.

16. The closure of claim 15, wherein the child resistant lock further includes an outwardly-extending lip coupled to an outer surface of the second side wall and extending outwardly away from the second side wall.

17. The closure of claim 16, wherein the outwardly-extending lip further includes an upper surface that is arranged to lie above a lower end of the side wall of the flip-top cap in the closed arrangement, and wherein the outwardly-extending lip cooperates with the second side wall of the body portion to define a channel and a lower end of the side wall of the flip-top cap is received in the channel when the flip-top cap is in the closed arrangement.

18. The closure of claim 15, wherein the outwardly-extending flange of the actuator pad has an upper surface that extends outwardly away from the side wall of the flip-top cap such that an outer end of the outwardly-extending flange is spaced apart from the side wall of the flip-top cap.

19. The closure of claim 18, wherein the outer end of the outwardly-extending flange is spaced apart from the side wall of the flip-top cap a first distance and the tab retainer is configured to deflect inwardly toward the first side wall of the body portion a second distance, the first distance being greater than or equal to the second distance.

20. The closure of claim 15, wherein the child resistant lock further includes a cap-opening lip coupled to an outer surface of the side wall of the flip-top cap, the cap-opening lip being aligned horizontally with the tab retainer and spaced apart vertically from an upper end of the actuator pad to define a finger-receiving space vertically between the actuator pad and the cap-opening lip.

* * * * *